US012490269B2

(12) United States Patent
Elshafie et al.

(10) Patent No.: US 12,490,269 B2
(45) Date of Patent: Dec. 2, 2025

(54) TECHNIQUES FOR CONTROL INFORMATION PARAMETER MODIFICATION IN WIRELESS COMMUNICATIONS

(71) Applicant: QUALCOMM Incorporated, San Diego, CA (US)

(72) Inventors: Ahmed Elshafie, San Diego, CA (US); Huilin Xu, Temecula, CA (US); Diana Maamari, San Diego, CA (US); Linhai He, San Diego, CA (US); Yuchul Kim, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 518 days.

(21) Appl. No.: 18/151,170

(22) Filed: Jan. 6, 2023

(65) Prior Publication Data

US 2024/0236995 A1  Jul. 11, 2024

(51) Int. Cl.
*H04W 72/21* (2023.01)
*H04W 72/02* (2009.01)

(52) U.S. Cl.
CPC ........... *H04W 72/21* (2023.01); *H04W 72/02* (2013.01)

(58) Field of Classification Search
CPC ..... H04W 72/21; H04W 72/02; H04W 72/56; H04W 52/42
See application file for complete search history.

(56) References Cited

U.S. PATENT DOCUMENTS

| | | | | |
|---|---|---|---|---|
| 2022/0322414 | A1* | 10/2022 | Khoshkholgh Dashtaki | ............... H04W 72/21 |
| 2022/0346104 | A1* | 10/2022 | Yi | .......................... H04W 72/56 |
| 2023/0171705 | A1* | 6/2023 | Go | .......................... H04W 52/42 370/318 |

* cited by examiner

*Primary Examiner* — Vinncelas Louis
(74) *Attorney, Agent, or Firm* — Arent Fox, LLP

(57) ABSTRACT

Aspects described herein relate to receiving control information activating periodic resources defined in a configuration for wireless communication, wherein the control information indicates resources for transmitting a control information response, and transmitting, to the second node and based on one or more power-related parameters of the first node, the control information response indicating a modification for one or more parameters related to the periodic resources. Other aspects relate to transmitting the control information and receiving the control information response.

30 Claims, 9 Drawing Sheets

TECHNIQUES FOR CONTROL INFORMATION PARAMETER MODIFICATION IN WIRELESS COMMUNICATIONS

FIELD OF THE DISCLOSURE

Aspects of the present disclosure relate generally to wireless communication systems, and more particularly, to techniques for modifying control information parameters.

DESCRIPTION OF RELATED ART

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which can be referred to as 5G new radio (5G NR)) is envisaged to expand and support diverse usage scenarios and applications with respect to current mobile network generations. In an aspect, 5G communications technology can include: enhanced mobile broadband addressing human-centric use cases for access to multimedia content, services and data; ultra-reliable-low latency communications (URLLC) with certain specifications for latency and reliability; and massive machine type communications, which can allow a very large number of connected devices and transmission of a relatively low volume of non-delay-sensitive information.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to an aspect, an apparatus for wireless communication is provided that includes a processor, memory coupled with the processor, and instructions stored in the memory. The instructions are operable, when executed by the processor, to cause the apparatus to receive, from a second node, control information activating periodic resources defined in a configuration for wireless communication, wherein the control information indicates resources for transmitting a control information response, and transmit, to the second node and based on one or more power-related parameters of the apparatus, the control information response indicating a modification for one or more parameters related to the periodic resources.

According to an aspect, an apparatus for wireless communication is provided that includes a processor, memory coupled with the processor, and instructions stored in the memory. The instructions are operable, when executed by the processor, to cause the apparatus to transmit, to a second node, control information activating periodic resources defined in a configuration for wireless communication, wherein the control information indicates resources for transmitting a control information response, and receive, from the second node and based on one or more power-related parameters of the second node, the control information response indicating a modification for one or more parameters related to the periodic resources.

According to an aspect, a method for wireless communication at a first node is provided that includes receiving, from a second node, control information activating periodic resources defined in a configuration for wireless communication, wherein the control information indicates resources for transmitting a control information response, and transmitting, to the second node and based on one or more power-related parameters of the first node, the control information response indicating a modification for one or more parameters related to the periodic resources.

According to an aspect, a method for wireless communication at a first node is provided that includes transmitting, to a second node, control information activating periodic resources defined in a configuration for wireless communication, wherein the control information indicates resources for transmitting a control information response, and receiving, from the second node and based on one or more power-related parameters of the second node, the control information response indicating a modification for one or more parameters related to the periodic resources.

In a further aspect, an apparatus for wireless communication is provided that includes a transceiver, a memory configured to store instructions, and one or more processors communicatively coupled with the transceiver and the memory. The one or more processors are configured to execute the instructions to perform the operations of methods described herein. In another aspect, an apparatus for wireless communication is provided that includes means for performing the operations of methods described herein. In yet another aspect, a computer-readable medium is provided including code executable by one or more processors to perform the operations of methods described herein.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
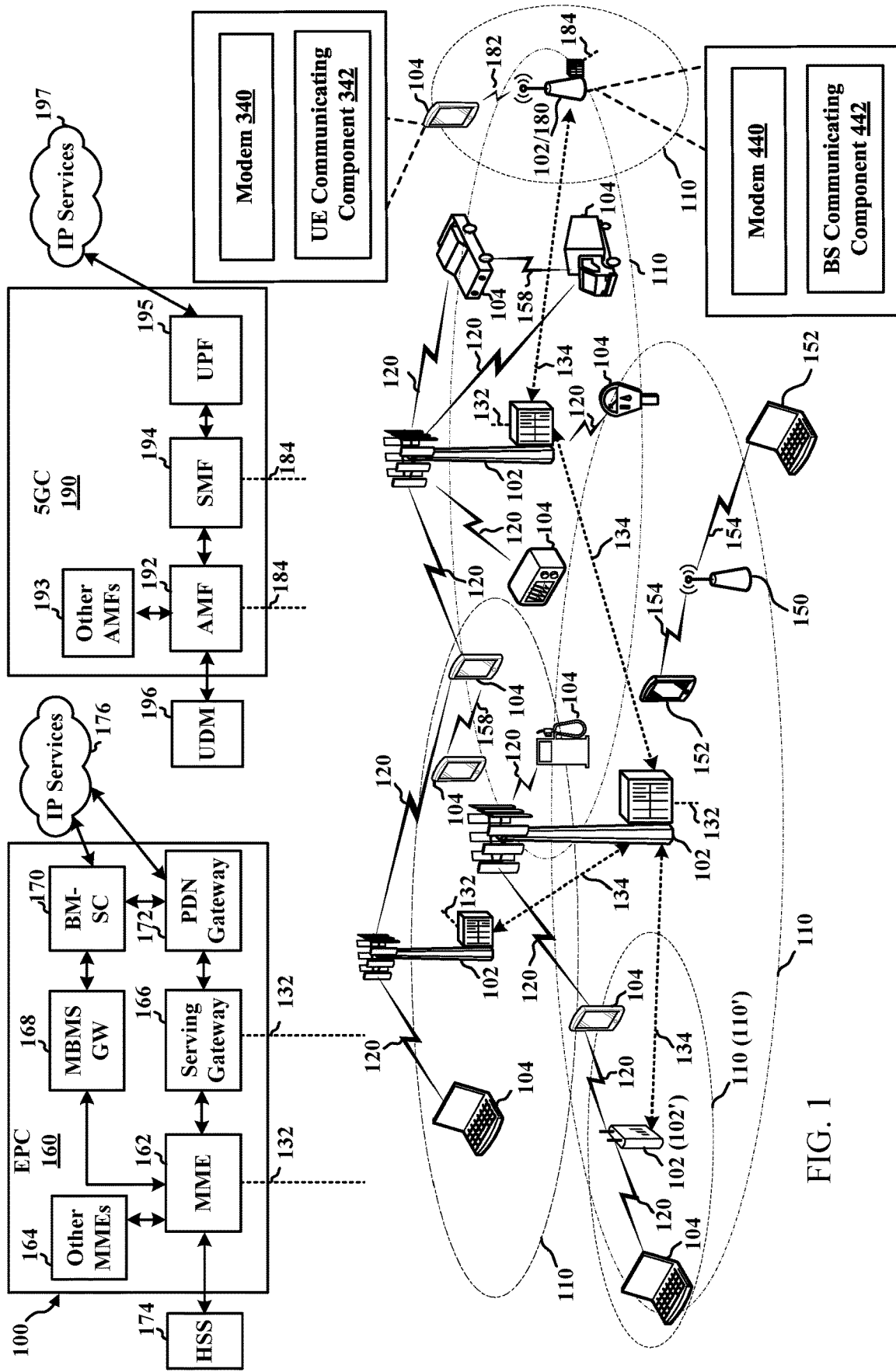
FIG. 1 illustrates an example of a wireless communication system, in accordance with various aspects of the present disclosure.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

The described features generally relate to providing control information response to modify control information parameters. For example, a device, such as a user equipment (UE) in fifth generation (5G) new radio (NR) or other wireless communication technologies, can receive control information and can request modification of control information parameters in response. This allows the device to influence how resources are scheduled for the device, which may improve device performance in certain scenarios. In one example, 5G NR can be used to provide extended reality (XR) applications, which may benefit from certain capacity improvements to the wireless communication technology. For example, more efficient resource allocation and scheduling can be provided for XR service characteristics (e.g., periodicity, multiple flows, jitter, latency, reliability, etc.). In some examples, scheduling grant enhancements can be provided to allow the device to effect one or more parameters related to scheduling grants. This can include modifying parameters related to semi-persistent scheduling (SPS) grants, configured grants (CG), dynamic scheduling/grants, etc.

For example, dynamic grant (DG)-based physical uplink shared channel (PUSCH) scheduling can rely on scheduling request (SR) and/or buffer status report (BSR), where a UE can transmit SR to inform a network node (e.g., gNB) that the UE has uplink (UL) to transmit, and/or the UE can transmit BSR to inform the network node of a volume of UL data to transmit. The network node can accordingly determine resources to schedule for the UE to transmit UL data. For DG-based PUSCH and/or physical downlink shared channel (PDSCH) scheduling, the UE can perform blind decoding for a physical downlink control channel (PDCCH) that indicates downlink control information (DCI) indicating resources scheduled for each transmission. The blind decoding for PDCCH can be time-consuming and power-consuming for a XR UE.

For CG-based PUSCH and/or PDSCH scheduling, the network node can assign resources for transmission in advance (e.g., using semi-static signaling, such as radio resource control (RRC) signaling). In CG-based scheduling, SR and/or BSR may not be required before PUSCH transmission, and the UE may not need to perform blind decoding for DCI for each transmission. However, the network node may not know the UL payload size and the number of practical resources to allocate for the UE to transmit PUSCH. In general, XR traffic can be latency sensitive.

For XR traffic, a set of protocol data units (PDUs) may be segmented into multiple packets (e.g., internet protocol (IP) packets)/PDUs at a lower layer (e.g., a media access control (MAC) layer, physical (PHY) layer, etc.). The PDUs belonging to the same PDU set can be transmitted on multiple CG occasions or multi-PUSCHs scheduled by one DCI. Both CGs and multi-PDSCH/PUSCH scheduled by a single DCI can be used to enable XR services. In addition, passive Internet-of-things (IoT) and energy harvesting (EH) may use such features due to the sporadic energy nature of such devices. Some UEs, such as power saving UEs, can adjust the DG transmissions and/or the configuration of CGs based on its power requirements. This can help with power saving and energy harvesting UEs, where UEs have limited energy storage and certain charging rate. For example, a UE can respond to a semi-persistent scheduling (SPS) activation DCI to adjust one of a modulation and coding scheme (MCS), number of layers, resource blocks (RBs), transport blocks (TBs), the periodicity, or masking some allocations, etc. Described herein are aspects related to enhancing communications using a control information response to modify control information parameters. Though described herein mostly in terms of downlink communications and DCI, the aspects may be generally applied to any wireless communication link between two nodes, where one node schedules resources for the other node to use in wireless communications.

For example, an interface between two nodes can include a communication system that may use a single tone (e.g., sinewave) or multi-tone (e.g., orthogonal frequency division multiplexing (OFDM)-based) waveform (which may include radio frequency (RF) waveforms) transmitted by a first device and reflected/backscattered by a second device (e.g., a EH device). The first device may refer to a network unit, integrated access and backhaul (IAB) relay, a relay node, a radio access network (RAN) node, a gNB, a transmission/reception point (TRP) associated with the network, a sidelink UE (remote, primary, programmable logic controller (PLC), or a controlling unit in sidelink), a Uu link UE transmitted waveform or RF signals described previously, etc. The waveform generated by the first device may carry data signal (e.g., PDSCH, PUSCH, physical sidelink shared channel (PSSCH), among other examples), reference signal (e.g., channel state information reference signal (CSI-RS), sounding reference signal (SRS), synchronization signal block (SSB), among other examples), or random data or reference signal signals/symbols across different sub-channels/resource elements (REs), etc. In some examples, the waveform may be sub-channels modulated OFDM signal/waveform or time-domain modulated OFDM-based signal/waveform. The communication signals in the interface may refer to a modulated waveform/signal generated, based on the capability of the EH device, by the EH device where the waveform can be one of single tone, multi-tone wave, as described. In some examples, the modulation used can be on-off keying (OOK), amplitude-shift keying (ASK), frequency-shift keying (FSK), phase-shift keying (PSK), Zadoff Chu, discrete Fourier transform (DFT), Walsh/Hadamard, Gold, Reed-Solomon, m-sequence, Chirp, among other examples. In some examples, modulation may occur in time domain or frequency domain or jointly. In some examples, Manchester coding may be used with ASK or OOK. In some examples, forward error correction codes and other channel coding may be applied to achieve higher reliability.

In some aspects, a UE may use two different interfaces where a first interface is associated with high power mode (or no to low power saving mode), this may be associated with a Uu or PC5 like interfaces, and a second interface is associated with same radio as the first interface with deactivation one or more on RF, hardware, software, firmware, etc. components or with a separate radio (e.g., backscatter-based) radio similar to a tag (e.g., passive or semi-passive) to be used with low to very low power saving modes (e.g., where the UE is maximizing the power saving). In some aspects, there may be an association between interface and type of signal. For example, if the signal is low priority or less important than data and regular/legacy UL signals (e.g., hybrid automatic repeat/request (HARQ)-acknowledgement (ACK), CSI report, etc.), the second interface may be used. If the signal is important (e.g., data), the first interface may be used. In some cases, the network can assign different signals to different interfaces based on priority, quality-of-service (QoS) requirements, power saving, etc. at the network and UE as well as based on reported energy information at UE (e.g., energy charging rate profile, discharging/power consumption rate profile, energy state/level profile) or based on UE preferences and traffic. For example, a UE can request certain mapping between signals and interfaces using Layer 1 (L1)/Layer 2 (L2)/Layer 3 (L3) signaling (dedicated or piggybacked/multiplexed with other signals), and NW can configure using L1/L2/L3 signaling. L3 or radio resource control (RRC) signals can include UE assistance information (UAI).

In one specific example, aspects described herein can be applied for SPS PDSCH configurations. For example, an SPS PDSCH configuration, which may be transmitted to a UE from a network node, can indicate a periodicity p, which defines the time between two SPS PDSCH occasions, and parameter K1, which specifies the PUCCH grant time in time slots to send HARQ-ACK after receiving the PDSCH. In addition, the network node can use RRC signaling to configure the SPS periodicity and HARQ-ACK feedback resources. The network node can then transmit DCI to activate, reactivate, or release SPS resources (e.g., SPS activation/reactivation DCI and/or SPS release DCI). The network node can use SPS activation DCI to activate a certain configured SPS. In the activation DCI, the network node can indicate transmit parameters such as MCS, RB allocation, antenna ports, etc. of transmissions over the SPS resources. The network node can use SPS reactivation DCI to change the transmit parameters such as MCS, RB allocation, antenna ports, etc. of transmissions over the SPS resources. The network node can use SPS release DCI to deactivate a configured SPS. Once a UE receives a DCI activation or reactivation, for example, the UE can begin monitoring the associated resources based on the SPS resources configured via RRC signaling and the parameters in the corresponding DCI.

In this example, in accordance with aspects described herein, a device that receives control information indicating resources or related parameters for transmitting or receiving wireless communications can send a control information response that can modify one or more of the received parameters to adapt the wireless communications for the device. For example, a UE receiving an indication or resources or related parameters for a DL SPS or UL CG can respond with a modified MCS, RB allocation, indication of antenna ports, starting offset, feedback offset, etc. In an example, the UE may modify, or request modification of, the parameters based on one or more power parameters of the device, such as a power consumption model, a current charging rate or charging rate profile, a discharging rate or discharging rate profile, an energy storage state or energy storage level, an energy storage capacity, etc. This can allow the UE to balance power consumption or available power with performance that can be achieved based on the modified parameters. This can, in turn, improve user experience when using the UE or other device.

The described features will be presented in more detail below with reference to FIGS. 1-9.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets, such as data from one component interacting with another component in a local system, distributed system, and/or across a network such as the Internet with other systems by way of the signal.

Techniques described herein may be used for various wireless communication systems such as CDMA, TDMA, FDMA, OFDMA, single carrier-FDMA, and other systems. The terms "system" and "network" may often be used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1×, 1×, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications (e.g., to fifth generation (5G) new radio (NR) networks or other next generation communication systems).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Various aspects or features will be presented in terms of systems that can include a number of devices, components, modules, and the like. It is to be understood and appreciated that the various systems can include additional devices, components, modules, etc. and/or may not include all of the devices, components, modules etc. discussed in connection with the figures. A combination of these approaches can also be used.

FIG. 1 is a diagram illustrating an example of a wireless communications system and an access network 100. The wireless communications system (also referred to as a wireless wide area network (WWAN)) can include base stations 102, UEs 104, an Evolved Packet Core (EPC) 160, and/or a 5G Core (5GC) 190. The base stations 102 may include macro cells (high power cellular base station) and/or small cells (low power cellular base station). The macro cells can include base stations. The small cells can include femtocells, picocells, and microcells. In an example, the base stations 102 may also include gNBs 180, as described further herein. In one example, some nodes of the wireless communication system may have a modem 340 and UE communicating component 342 for transmitting a control information response to modify one or more parameters received in control information, in accordance with aspects described herein. In addition, some nodes may have a modem 440 and BS communicating component 442 for processing a control information response to modify one or more parameters transmitted in control information, in accordance with aspects described herein. Though a UE 104 is shown as having the modem 340 and UE communicating component 342 and a base station 102/gNB 180 is shown as having the modem 440 and BS communicating component 442, this is one illustrative example, and substantially any node or type of node may include a modem 340 and UE communicating component 342 and/or a modem 440 and BS communicating component 442 for providing corresponding functionalities described herein.

The base stations 102 configured for 4G LTE (which can collectively be referred to as Evolved Universal Mobile Telecommunications System (UMTS) Terrestrial Radio Access Network (E-UTRAN)) may interface with the EPC 160 through backhaul links 132 (e.g., using an S1 interface). The base stations 102 configured for 5G NR (which can collectively be referred to as Next Generation RAN (NG-RAN)) may interface with 5GC 190 through backhaul links 184. In addition to other functions, the base stations 102 may perform one or more of the following functions: transfer of user data, radio channel ciphering and deciphering, integrity protection, head compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or 5GC 190) with each other over backhaul links 134 (e.g., using an X2 interface). The backhaul links 134 may be wired or wireless.

The base stations 102 may wirelessly communicate with one or more UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be referred to as a heterogeneous network. A heterogeneous network may also include Home Evolved Node Bs (eNBs) (HeNBs), which may provide service to a restricted group, which can be referred to as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (e.g., for x component carriers) used for transmission in the DL and/or the UL direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

In another example, certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or other type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 182 with the UE 104 to compensate for the extremely high path loss and short range. A base station 102 referred to herein can include a gNB 180.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The 5GC 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 can be a control node that processes the signaling between the UEs 104 and the 5GC 190. Generally, the AMF 192 can provide QoS flow and session management. User Internet protocol (IP) packets (e.g., from one or more UEs 104) can be transferred through the UPF 195. The UPF 195 can provide UE IP address allocation for one or more UEs, as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or 5GC 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). IoT UEs may include machine type communication (MTC)/enhanced MTC (eMTC, also referred to as category (CAT)-M, Cat M1) UEs, NB-IoT (also referred to as CAT NB1) UEs, as well as other types of UEs. In the present disclosure, eMTC and NB-IoT may refer to future technologies that may evolve from or may be based on these technologies. For example, eMTC may include FeMTC (further eMTC), eFeMTC (enhanced further eMTC), mMTC (massive MTC), etc., and NB-IoT may include eNB-IoT (enhanced NB-IoT), FeNB-IoT (further enhanced NB-IoT), etc. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Deployment of communication systems, such as 5G new radio (NR) systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS, e.g., BS 102), or one or more units (or one or more components) performing base station functionality, may be implemented in an aggregated or disaggregated architecture. For example, a BS (such as a Node B (NB), evolved NB (eNB), NR BS, 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units, i.e., a virtual central unit (VCU), a virtual distributed unit (VDU), or a virtual radio unit (VRU).

Base station-type operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

In an example, UE communicating component 342 can receive one or more parameters related to resources scheduled for wireless communication, such as an activation DCI for PDSCH or PUSCH resources. In an example, UE communicating component 342 can transmit a control information response that includes a request to modify the one or more parameters, which may be based on a power consumption model or one or more power-related parameters at the UE 104. BS communicating component 442 can transmit the one or more parameters related to resources scheduled for wireless communication and/or can receive a control information response requesting modification of one or more parameters. In an example, BS communicating component 442 can accordingly modify the one or more parameters and/or can transmit a notification that the one or more parameters are modified. UE communicating component 342 and BS communicating component 442 can communicate over the scheduled resources based on the one or more modified parameters.

Figure 2:
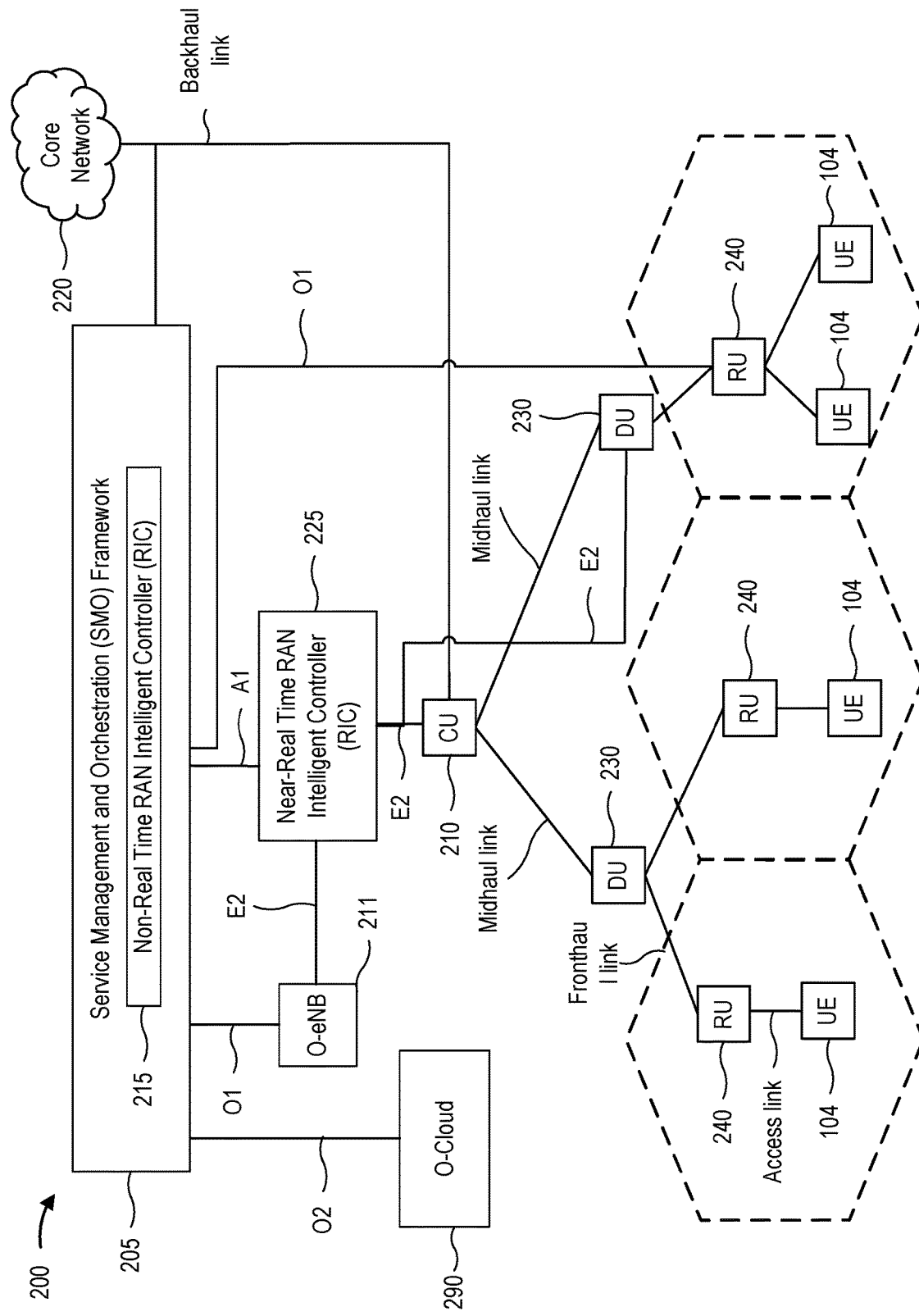
FIG. 2 is a diagram illustrating an example of disaggregated base station architecture, in accordance with various aspects of the present disclosure.

FIG. 2 shows a diagram illustrating an example of disaggregated base station 200 architecture. The disaggregated base station 200 architecture may include one or more central units (CUs) 210 that can communicate directly with a core network 220 via a backhaul link, or indirectly with the core network 220 through one or more disaggregated base station units (such as a Near-Real Time (Near-RT) RAN Intelligent Controller (RIC) 225 via an E2 link, or a Non-Real Time (Non-RT) RIC 215 associated with a Service Management and Orchestration (SMO) Framework 205, or both). A CU 210 may communicate with one or more distributed units (DUs) 230 via respective midhaul links, such as an F1 interface. The DUs 230 may communicate with one or more radio units (RUs) 240 via respective fronthaul links. The RUs 240 may communicate with respective UEs 104 via one or more radio frequency (RF) access links. In some implementations, the UE 104 may be simultaneously served by multiple RUs 240.

Each of the units, e.g., the CUs 210, the DUs 230, the RUs 240, as well as the Near-RT RICs 225, the Non-RT RICs 215 and the SMO Framework 205, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 210 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 210. The CU 210 may be configured to handle user plane functionality (i.e., Central Unit-User Plane (CU-UP)), control plane functionality (i.e., Central Unit-Control Plane (CU-CP)), or a combination thereof. In some implementations, the CU 210 can be logically split into one or more CU-UP units and one or more CU-CP units. The CU-UP unit can communicate bidirectionally with the CU-CP unit via an interface, such as the E1 interface when implemented in an O-RAN configuration. The CU 210 can be implemented to communicate with the DU 230, as necessary, for network control and signaling.

The DU 230 may correspond to a logical unit that includes one or more base station functions to control the operation of one or more RUs 240. In some aspects, the DU 230 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the third Generation Partnership Project (3GPP). In some aspects, the DU 230 may further host one or more low PHY layers. Each layer (or module) can be implemented with an interface configured to communicate signals with other layers (and modules) hosted by the DU 230, or with the control functions hosted by the CU 210.

Lower-layer functionality can be implemented by one or more RUs 240. In some deployments, an RU 240, controlled by a DU 230, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 240 can be implemented to handle over the air (OTA) communication with one or more UEs 104. In some implementations, real-time and non-real-time aspects of control and user plane communication with the RU(s) 240 can be controlled by the corresponding DU 230. In some scenarios, this configuration can enable the DU(s) 230 and the CU 210 to be implemented in a cloud-based RAN architecture, such as a vRAN architecture.

The SMO Framework 205 may be configured to support RAN deployment and provisioning of non-virtualized and virtualized network elements. For non-virtualized network elements, the SMO Framework 205 may be configured to support the deployment of dedicated physical resources for RAN coverage requirements which may be managed via an operations and maintenance interface (such as an O1 interface). For virtualized network elements, the SMO Framework 205 may be configured to interact with a cloud computing platform (such as an open cloud (O-Cloud) 290) to perform network element life cycle management (such as to instantiate virtualized network elements) via a cloud computing platform interface (such as an O2 interface). Such virtualized network elements can include, but are not limited to, CUs 210, DUs 230, RUs 240 and Near-RT RICs 225. In some implementations, the SMO Framework 205 can communicate with a hardware aspect of a 4G RAN, such as an open eNB (O-eNB) 211, via an O1 interface. Additionally, in some implementations, the SMO Framework 205 can communicate directly with one or more RUs 240 via an O1 interface. The SMO Framework 205 also may include a Non-RT RIC 215 configured to support functionality of the SMO Framework 205.

The Non-RT RIC 215 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 225. The Non-RT RIC 215 may be coupled to or communicate with (such as via an A1 interface) the Near-RT RIC 225. The Near-RT RIC 225 may be configured to include a logical function that enables near-real-time control and optimization of RAN elements and resources via data collection and actions over an interface (such as via an E2 interface) connecting one or more CUs 210, one or more DUs 230, or both, as well as an O-eNB, with the Near-RT RIC 225.

In some implementations, to generate AI/ML models to be deployed in the Near-RT RIC 225, the Non-RT RIC 215 may receive parameters or external enrichment information from external servers. Such information may be utilized by the Near-RT RIC 225 and may be received at the SMO Framework 205 or the Non-RT RIC 215 from non-network data sources or from network functions. In some examples, the Non-RT RIC 215 or the Near-RT RIC 225 may be configured to tune RAN behavior or performance. For example, the Non-RT RIC 215 may monitor long-term trends and patterns for performance and employ AI/ML models to perform corrective actions through the SMO Framework 205 (such as reconfiguration via O1) or via creation of RAN management policies (such as A1 policies).

Figure 3:
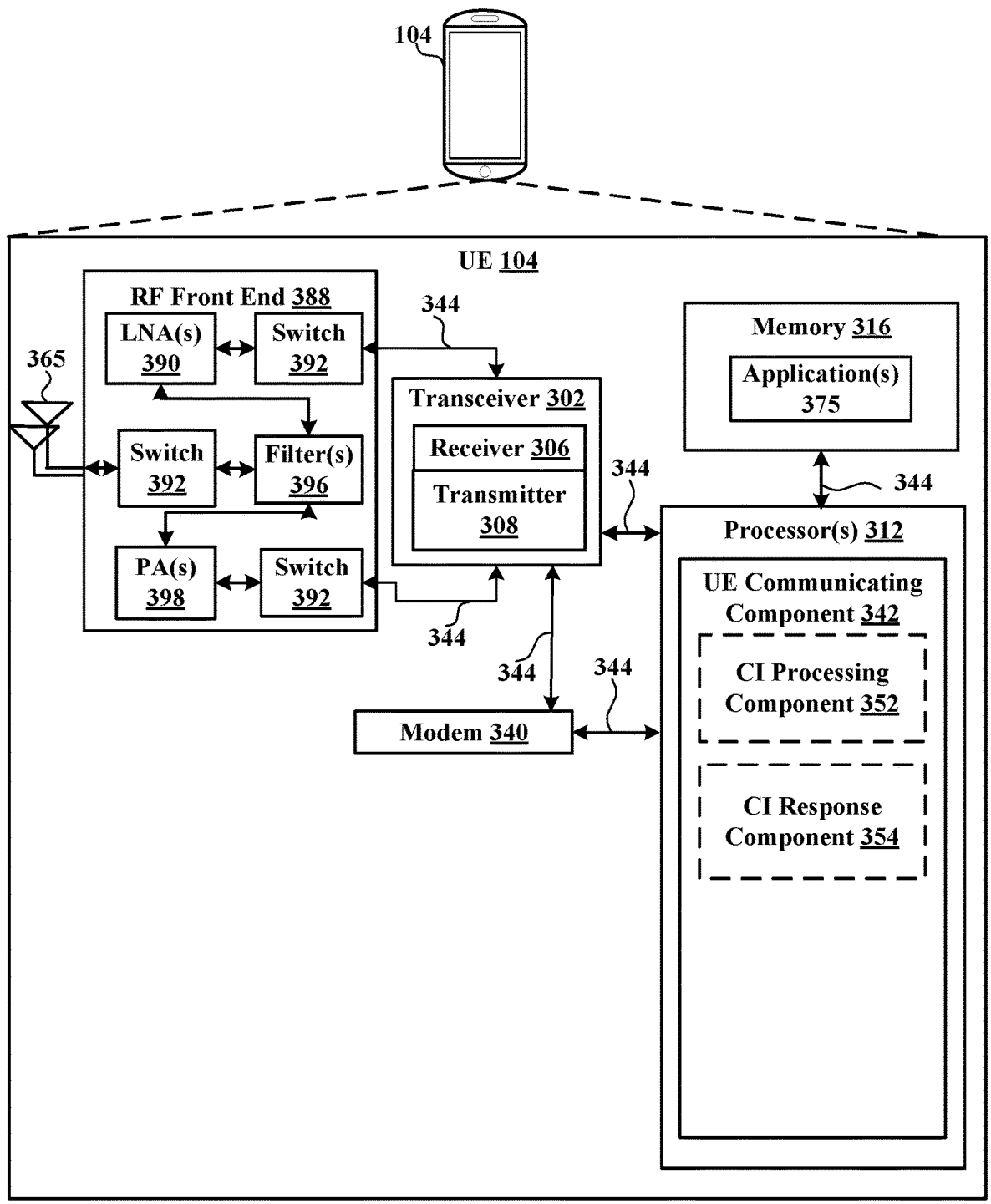
FIG. 3 is a block diagram illustrating an example of a user equipment (UE), in accordance with various aspects of the present disclosure.
Figure 4:
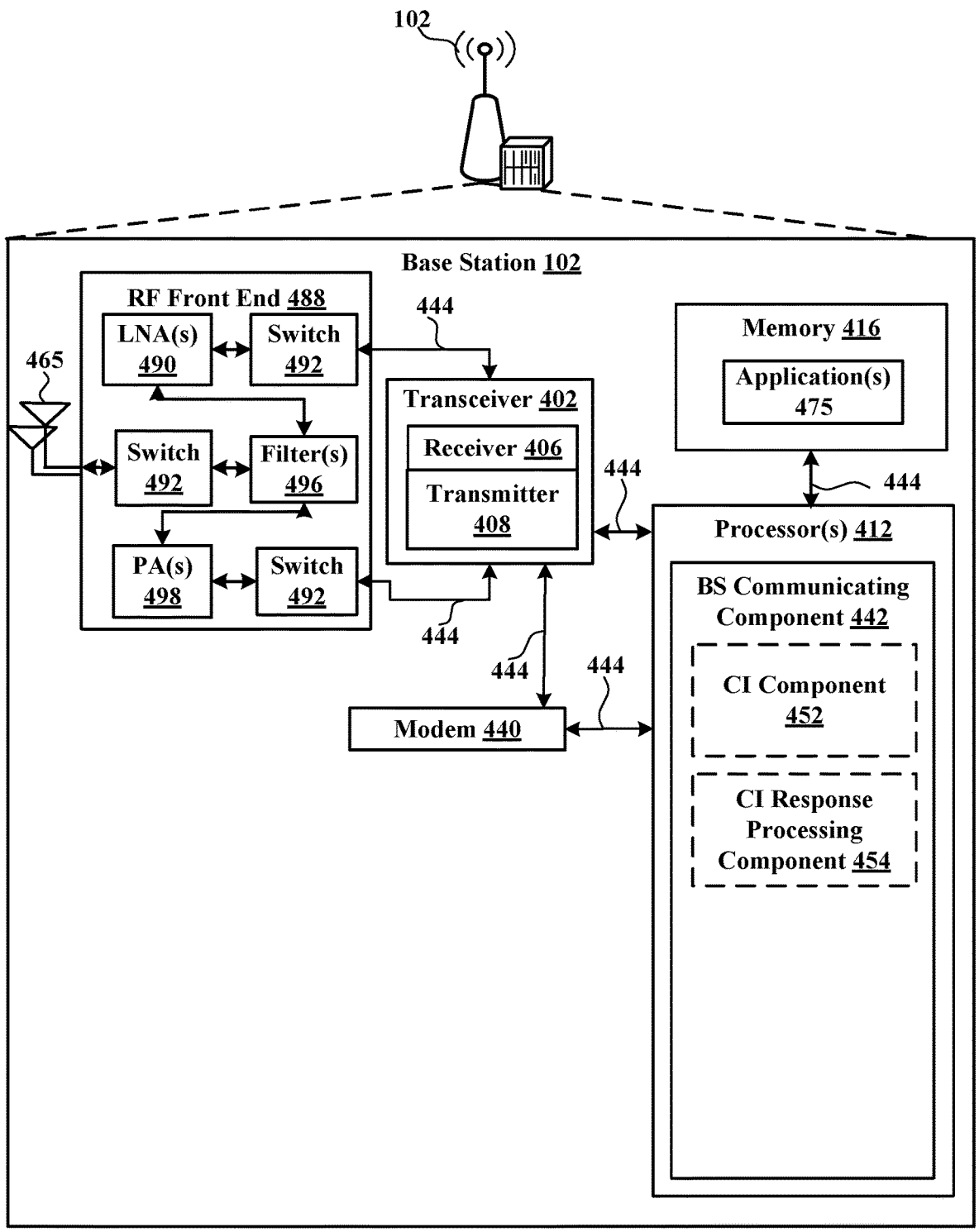
FIG. 4 is a block diagram illustrating an example of a base station, in accordance with various aspects of the present disclosure.
Figure 5:
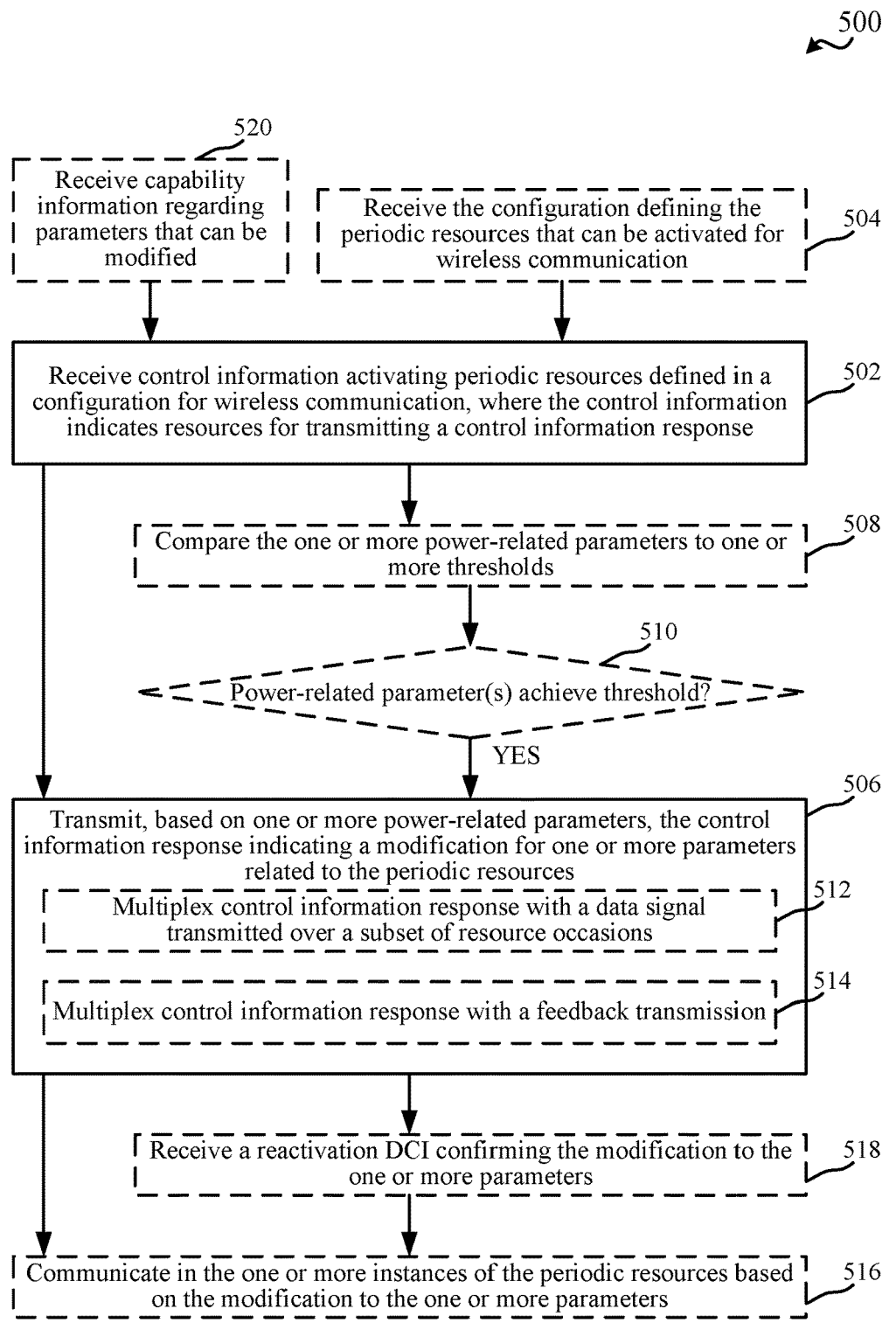
FIG. 5 is a flow chart illustrating an example of a method for transmitting a control information response, in accordance with aspects described herein.
Figure 6:
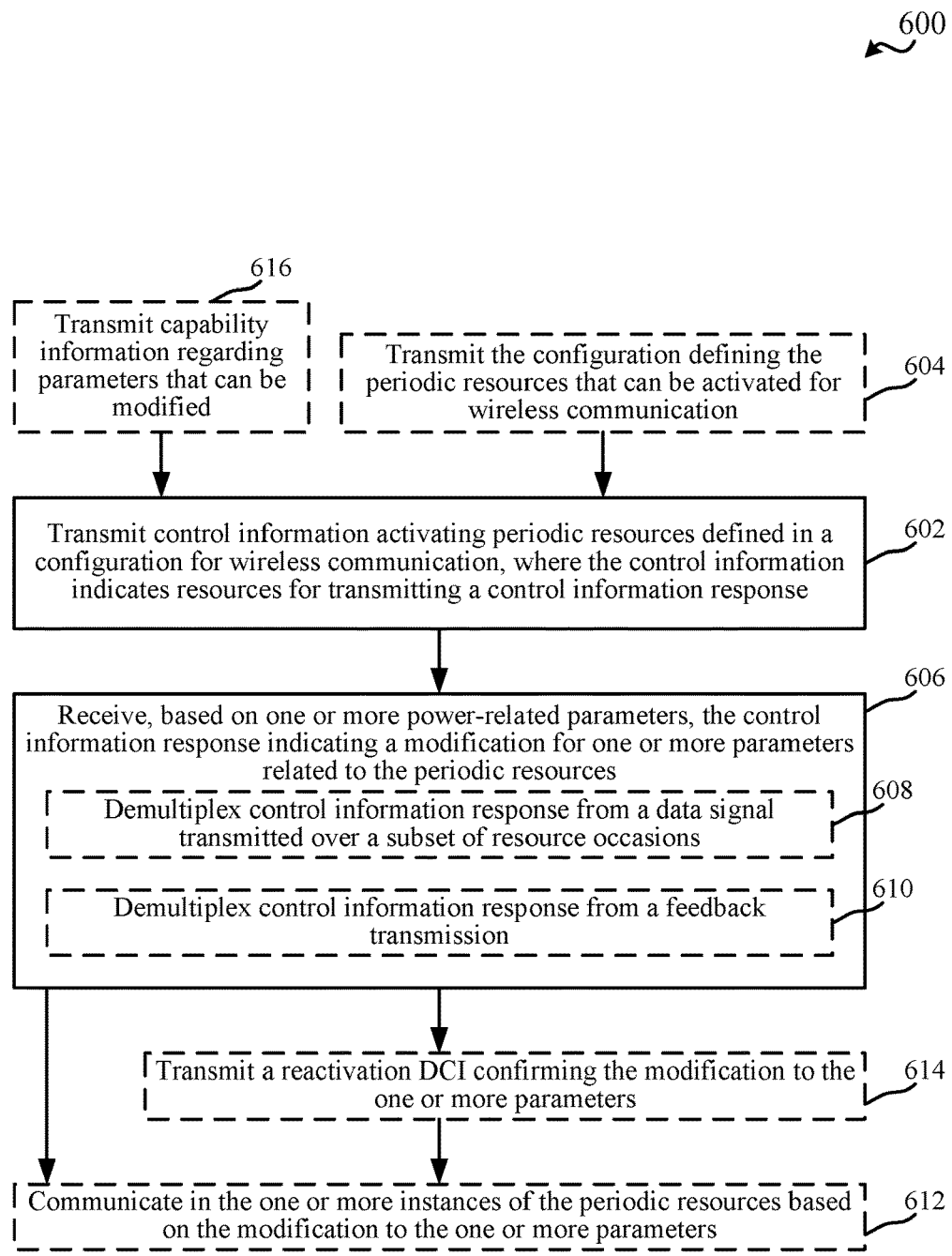
FIG. 6 is a flow chart illustrating an example of a method for processing a control information response, in accordance with aspects described herein.

Turning now to FIGS. 3-9, aspects are depicted with reference to one or more components and one or more methods that may perform the actions or operations described herein, where aspects in dashed line may be optional. Although the operations described below in FIGS. 5 and 6 are presented in a particular order and/or as being performed by an example component, it should be understood that the ordering of the actions and the components performing the actions may be varied, depending on the implementation. Moreover, it should be understood that the following actions, functions, and/or described components may be performed by a specially programmed processor, a processor executing specially programmed software or computer-readable media, or by any other combination of a hardware component and/or a software component capable of performing the described actions or functions.

Referring to FIG. 3, one example of an implementation of UE 104 may include a variety of components, some of which have already been described above and are described further herein, including components such as one or more processors 312 and memory 316 and transceiver 302 in communication via one or more buses 344, which may operate in conjunction with modem 340 and/or UE communicating component 342 for transmitting a control information response to modify one or more parameters received in control information, in accordance with aspects described herein.

In an aspect, the one or more processors 312 can include a modem 340 and/or can be part of the modem 340 that uses one or more modem processors. Thus, the various functions related to UE communicating component 342 may be included in modem 340 and/or processors 312 and, in an aspect, can be executed by a single processor, while in other aspects, different ones of the functions may be executed by a combination of two or more different processors. For example, in an aspect, the one or more processors 312 may include any one or any combination of a modem processor, or a baseband processor, or a digital signal processor, or a transmit processor, or a receiver processor, or a transceiver processor associated with transceiver 302. In other aspects, some of the features of the one or more processors 312 and/or modem 340 associated with UE communicating component 342 may be performed by transceiver 302.

Also, memory 316 may be configured to store data used herein and/or local versions of applications 375 or UE communicating component 342 and/or one or more of its subcomponents being executed by at least one processor 312. Memory 316 can include any type of computer-readable medium usable by a computer or at least one processor 312, such as random access memory (RAM), read only memory (ROM), tapes, magnetic discs, optical discs, volatile memory, non-volatile memory, and any combination thereof. In an aspect, for example, memory 316 may be a non-transitory computer-readable storage medium that stores one or more computer-executable codes defining UE communicating component 342 and/or one or more of its subcomponents, and/or data associated therewith, when UE 104 is operating at least one processor 312 to execute UE communicating component 342 and/or one or more of its subcomponents.

Transceiver 302 may include at least one receiver 306 and at least one transmitter 308. Receiver 306 may include hardware, firmware, and/or software code executable by a processor for receiving data, the code comprising instructions and being stored in a memory (e.g., computer-readable medium). Receiver 306 may be, for example, a radio frequency (RF) receiver. In an aspect, receiver 306 may receive signals transmitted by at least one base station 102. Additionally, receiver 306 may process such received signals, and also may obtain measurements of the signals, such as, but not limited to, Ec/Io, signal-to-noise ratio (SNR), reference signal received power (RSRP), received signal strength indicator (RSSI), etc. Transmitter 308 may include hardware, firmware, and/or software code executable by a processor for transmitting data, the code comprising instructions and being stored in a memory (e.g., computer-readable medium). A suitable example of transmitter 308 may including, but is not limited to, an RF transmitter.

Moreover, in an aspect, UE 104 may include RF front end 388, which may operate in communication with one or more antennas 365 and transceiver 302 for receiving and transmitting radio transmissions, for example, wireless communications transmitted by at least one base station 102 or wireless transmissions transmitted by UE 104. RF front end 388 may be connected to one or more antennas 365 and can include one or more low-noise amplifiers (LNAs) 390, one or more switches 392, one or more power amplifiers (PAs) 398, and one or more filters 396 for transmitting and receiving RF signals.

In an aspect, LNA 390 can amplify a received signal at a desired output level. In an aspect, each LNA 390 may have a specified minimum and maximum gain values. In an aspect, RF front end 388 may use one or more switches 392 to select a particular LNA 390 and its specified gain value based on a desired gain value for a particular application.

Further, for example, one or more PA(s) 398 may be used by RF front end 388 to amplify a signal for an RF output at a desired output power level. In an aspect, each PA 398 may have specified minimum and maximum gain values. In an aspect, RF front end 388 may use one or more switches 392 to select a particular PA 398 and its specified gain value based on a desired gain value for a particular application.

Also, for example, one or more filters 396 can be used by RF front end 388 to filter a received signal to obtain an input RF signal. Similarly, in an aspect, for example, a respective filter 396 can be used to filter an output from a respective PA 398 to produce an output signal for transmission. In an aspect, each filter 396 can be connected to a specific LNA 390 and/or PA 398. In an aspect, RF front end 388 can use one or more switches 392 to select a transmit or receive path using a specified filter 396, LNA 390, and/or PA 398, based on a configuration as specified by transceiver 302 and/or processor 312.

As such, transceiver 302 may be configured to transmit and receive wireless signals through one or more antennas 365 via RF front end 388. In an aspect, transceiver may be tuned to operate at specified frequencies such that UE 104 can communicate with, for example, one or more base stations 102 or one or more cells associated with one or more base stations 102. In an aspect, for example, modem 340 can configure transceiver 302 to operate at a specified frequency and power level based on the UE configuration of the UE 104 and the communication protocol used by modem 340.

In an aspect, modem 340 can be a multiband-multimode modem, which can process digital data and communicate with transceiver 302 such that the digital data is sent and received using transceiver 302. In an aspect, modem 340 can be multiband and be configured to support multiple frequency bands for a specific communications protocol. In an aspect, modem 340 can be multimode and be configured to support multiple operating networks and communications protocols. In an aspect, modem 340 can control one or more components of UE 104 (e.g., RF front end 388, transceiver 302) to enable transmission and/or reception of signals from the network based on a specified modem configuration. In an aspect, the modem configuration can be based on the mode of the modem and the frequency band in use. In another aspect, the modem configuration can be based on UE configuration information associated with UE 104 as provided by the network during cell selection and/or cell reselection.

In an aspect, UE communicating component 342 can optionally include a CI processing component 352 for processing control information (CI) received from another device (e.g., a network node, another UE in sidelink communications, etc.), and/or a CI response component 354 for transmitting a CI response for the CI that requests modification of one or more parameters received in, or otherwise related to, the CI, in accordance with aspects described herein. As described above, in one example, a base station 102 or other device (e.g., a IoT device, EH device, etc.) may additionally or alternatively include the UE communicating component 342 for transmitting a control information response to modify one or more parameters received in control information. For example, the device including UE communicating component 342 may not include the same RF components or other components of the UE 104, and/or may include components capable of reflecting or backscattering signals (e.g., as opposed to generating signals for transmission).

In an aspect, the processor(s) 312 may correspond to one or more of the processors described in connection with the UE in FIG. 9. Similarly, the memory 316 may correspond to the memory described in connection with the UE in FIG. 9.

Referring to FIG. 4, one example of an implementation of base station 102 (e.g., a base station 102 and/or gNB 180, as described above) may include a variety of components, some of which have already been described above, but including components such as one or more processors 412 and memory 416 and transceiver 402 in communication via one or more buses 444, which may operate in conjunction with modem 440 and BS communicating component 442 for processing a control information response to modify one or more parameters transmitted in control information, in accordance with aspects described herein.

The transceiver 402, receiver 406, transmitter 408, one or more processors 412, memory 416, applications 475, buses 444, RF front end 488, LNAs 490, switches 492, filters 496, PAs 498, and one or more antennas 465 may be the same as or similar to the corresponding components of UE 104, as described above, but configured or otherwise programmed for base station operations as opposed to UE operations.

In an aspect, BS communicating component 442 can optionally include a CI component 452 for transmitting CI to another device (e.g., a UE), and/or a CI response processing component 454 for receiving a CI response for the CI that requests modification of one or more parameters received in, or otherwise related to, the CI, in accordance with aspects described herein. As described above, in one example, a UE 104 or other device (e.g., a IoT device, EH device, etc.) may additionally or alternatively include the BS communicating component 442 for processing a control information response to modify one or more parameters transmitted in control information. For example, the device including BS communicating component 442 may not include the same RF components or other components of the base station 102, and/or may include components capable of reflecting or backscattering signals (e.g., as opposed to generating signals for transmission).

In an aspect, the processor(s) 412 may correspond to one or more of the processors described in connection with the base station in FIG. 9. Similarly, the memory 416 may correspond to the memory described in connection with the base station in FIG. 9.

FIG. 5 illustrates a flow chart of an example of a method 500 for transmitting a control information response, in accordance with aspects described herein. FIG. 6 illustrates a flow chart of an example of a method 600 for processing a control information response, in accordance with aspects described herein. In an example, a UE 104 or other device (e.g., an IoT device, EH device, etc.) can perform the functions described in method 500 using one or more of the components described in FIGS. 1 and 3. In an example, a network node (e.g., a base station 102 or gNB 180, a monolithic base station or gNB, a portion of a disaggregated base station or gNB, etc.), a UE 104 in sidelink communications, etc. can perform the functions described in method 600 using one or more of the components described in FIGS. 1 and 4. Methods 500 and 600 are described in conjunction with one another for ease of explanation; however, the methods 500 and 600 are not required to be performed together and indeed can be performed independently using separate devices.

In method 600, at Block 602, control information activating periodic resources defined in a configuration for wireless communication can be transmitted, where the control information indicates resources for transmitting a control information response. In an aspect, CI component 452, e.g., in conjunction with processor(s) 412, memory 416, transceiver 402, BS communicating component 442, etc., can transmit the control information activating the periodic resources defined in the configuration for wireless communication, where the control information indicates resources for transmitting the control information response. For example, the control information can include one or more parameters for activating or reactivating configured resources, such as an activation DCI, reactivation DCI, etc.

In method 500, at Block 502, control information activating periodic resources defined in a configuration for wireless communication can be received, where the control information indicates resources for transmitting a control information response. In an aspect, CI processing component 352, e.g., in conjunction with processor(s) 312, memory 316, transceiver 302, UE communicating component 342, etc., can receive the control information activating periodic resources defined in the configuration for wireless communication, where the control information indicates resources for transmitting the control information response. For example, CI processing component 352 can receive, e.g., from a network node, such as a gNB or base station 102, a disaggregated portion thereof, etc., control information activating or reactivating periodic resources (e.g., an activation DCI, reactivation DCI, etc.).

In one example, optionally at Block 604, the configuration defining the periodic resources that can be activated for wireless communication can be transmitted. In an aspect, CI component 452, e.g., in conjunction with processor(s) 412, memory 416, transceiver 402, BS communicating component 442, etc., can transmit the configuration defining the periodic resources that can be activated for wireless communication. For example, CI component 452 can transmit the configuration using semi-static signaling, such as RRC signaling, and can activate the configured resources in certain time periods and/or with certain parameters using an activation or reactivation control information. In an example, the configuration can include parameters for configuring DL SPS resources, UL CG resources, etc. In an example, the activation or reactivation control information may indicate a MCS, RB allocation, starting offset in time (e.g., in symbols) from the control information to the first allocated RB, feedback offset in time (e.g., in symbols) for transmitting feedback for the control information, etc. In another example, the activation or reactivation control information may indicate one or more parameters related to transmitting a control information response, such as an indication of resources (e.g., an offset in time) over which to transmit the control information response.

In method 500, optionally at Block 504, the configuration defining the periodic resources that can be activated for wireless communication can be received. In an aspect, CI processing component 352, e.g., in conjunction with processor(s) 312, memory 316, transceiver 302, UE communicating component 342, etc., can receive the configuration defining the periodic resources that can be activated for wireless communication. For example, as described, CI processing component 352 can receive the configuration using semi-static signaling, such as RRC signaling, and the configuration may configure DL SPS resources, UL CG resources, or any resources scheduled by another node for UE 104 or other device performing method 500. In any case, as described, the control information can activate or reactivate at least a portion of the configured resources, and can include one or more corresponding parameters. In addition, as described, the control information or another configuration can indicate resources for transmitting a control information response to the control information, which may request modification of one or more parameters related to the configured and/or activated/reactivated resources.

In one example, where the configuration defining the periodic resources is separately transmitted/received, the periodic resources can correspond to a Type 2 CG where the configuration configures the resources and a separate DCI activates the resources. In other examples, however, such as where the configuration is not separately received, the control information at Blocks 502 and/or 602 can include a Type 1 CG where the control information is semi-static RRC signaling used to configure and activate the periodic resources without requiring a separate activation DCI.

In an example, the control information may include a periodicity of the periodic resources, a CG index (e.g., for uplink grants), a SPS index (e.g., for downlink grants), etc. In another example, the control information can include a list of selectable periodicities for the periodic resources, a list of selectable CG indices corresponding to configured CGs (e.g., corresponding to CGs configured by RRC signaling), a list of selectable SPS indices corresponding to configured SPS grants (e.g., corresponding to SPS grants configured by RRC signaling), etc. In addition, in an example, the control information can include a DCI scheduling grant that schedules multiple data reception or data transmission resources, such as PDSCH resource, PUSCH resources, etc. In another example, the control information may include a gap defined between resources scheduled by the same DCI scheduling grant, multiple selectable gaps for the scheduling grants scheduled by the same DCI, a number of scheduling grants to be scheduled by a single DCI, multiple selectable numbers of scheduling grants to be scheduled by a single DCI, etc. As described, for example, the control information can be received in (e.g., configured by) DCI, MAC-CE, RRC signaling (e.g., L1, L2, L3 signaling), etc. In one example, CI processing component 352 can receive the control information in scheduling DCI or non-scheduling DCI or piggybacked as control information on PDSCH.

In addition, for example, the control information may be generated and/or transmitted by the network node and/or received by the UE 104 based on UE capability. For example, the UE 104 can transmit capability information, to the network node or other node scheduling the UE 104, that indicates a capability of the UE 104 regarding the one or more parameters or the periodic resources. For example, the capability may indicate that the UE 104 can select periodicities, grant indices, gaps, etc., and the network node can configure the control information based on the capability indicated by the UE 104.

In method 500, at Block 506, the control information response indicating a modification for one or more parameters specified in the configuration defining the periodic resources can be transmitted based on one or more power-related parameters. In an aspect, CI response component 354, e.g., in conjunction with processor(s) 312, memory 316, transceiver 302, UE communicating component 342, etc., can transmit, based on one or more power-related parameters, the control information response indicating a modification for one or more parameters related to the periodic resources. For example, the control information response can request modification of one or more parameters indicated in the configuration defining the periodic resources, one or more parameters indicated in the control information (e.g., in the activation/reactivation control information), etc.

In method 600, at Block 606, the control information response indicating a modification for one or more parameters specified in the configuration defining the periodic resources can be received based on one or more power-related parameters. In an aspect, CI response processing component 454, e.g., in conjunction with processor(s) 412, memory 416, transceiver 402, BS communicating component 442, etc., can receive and/or process, based on one or more power-related parameters, the control information response indicating a modification for one or more parameters related to the periodic resources. For example, the control information response can request modification of one or more parameters indicated in the configuration defining the periodic resources, one or more parameters indicated in the control information (e.g., in the activation/reactivation control information), etc.

For example, CI response component 354 can generate the control information response to request modification of one or more parameters related to receiving corresponding PDSCH/PSSCH communications or transmitting PUSCH/PSSCH communications (or other communications for IoT or EH devices), such as grant periodicity, MCS, number of antenna layers or ports, number of RBs, TBS, starting offset, feedback offset, etc. to impact power consumption at the device. In one example, the power-related parameters may correspond to a power consumption model at the UE 104 (or other device performing method 500), such as a current charging rate or charging rate profiles, a discharging rate or discharging rate profile, an energy storage state or level, an energy storage capacity, a UE class that may indicate one or more of the above parameters, etc. For example, where the UE 104 is in a low power state, CI response component 354 can generate and/or transmit the control information response requesting a lower periodicity, a lower MCS, a less number of antenna layers or ports, a less number of RBs, a larger TBS, a different starting or feedback offset, etc.

Though described in terms of periodic resources, the functionality described herein can also be applied for single PUSCH or PDSCH allocations. For example, the control information transmitted at Block 602 or received at Block 502 can include DCI indicating PUSCH or PDSCH (or sidelink control information (SCI) indicating PSSCH) allocation. In this example, the DCI may indicate resources for transmitting a control information response to modify one or more parameters in the DCI, and CI response component 354 can accordingly generate and transmit the control information response indicating a request to modify the one or more parameters in the DCI.

In addition, for example, the CI response component 354 can request modification to parameters in control information using direct adjustments, based on delta adjustments (which may be defined in RRC signaling from the network node, MAC-CE from the base station 102, the control information from the base station, etc.). For example, the network node can indicate to UE 104 (e.g., in the control information, configuration of periodic resources, etc.) to use MCS=x, and/or may also indicate that the UE can request modification of the MCS to x, x+$\Delta_1$, or x−$\Delta_2$, etc. For example, $\Delta_2$ can be same or different from $\Delta_1$, and/or they can have same or different sign. In an example, $\Delta_1$ and/or $\Delta_2$ can be given in DCI or based on some RRC/MAC-CE configuration (e.g., as defined values) or another DCI (e.g., scheduling or non-scheduling DCI that has the parameters or deltas that the UE can use in requesting modification of parameters in a control information response). In another example, CI response component 354 can indicate a value to which to modify the parameter based on an index corresponding to different values that may be configured via RRC signaling, MAC-CE, DCI, etc. For example, the UE 104 can receive a list of values for one or more parameters, and CI response component 354 can request modification of a value by specifying an index of the value in the list.

In an example, CI response component 354 can request modification of a periodicity of the periodic resources, a CG index, or a SPS index, which may be indicated in the configuration. In one example, where the configuration indicates a list of periodicities, CG indices, or SPS indices, CI response component 354 can transmit the control information response indicating an index of a periodicity, CG index, or SPS index indicated in the list. In another example, CI response component 354 can request modification of a gap between resources scheduled by a single DCI, or a number of resources scheduled by a single DCI (e.g., PDSCH or PUSCH resources). In one example, where the configuration indicates a list of gaps or numbers of resources, CI response component 354 can transmit the control information response indicating an index of a gap or number of resources as indicated in the list.

In one example, in method 500, optionally at Block 508, the one or more power-related parameters can be compared to one or more thresholds, and optionally at Block 510, if the power-related parameter(s) are determined to achieve a threshold, at Block 506, the control information response is transmitted. In an aspect, CI response component 354, e.g., in conjunction with processor(s) 312, memory 316, transceiver 302, UE communicating component 342, etc., can compare the one or more power-related parameters to the one or more thresholds, and can transmit the control information if the power-related parameter(s) achieve a threshold. For example, CI response component 354 can compare parameters of a power consumption model to a threshold. In an example, the parameters may include a current charging rate of the device, a charging rate profile (e.g., a collection of charging rates over a period of time), a current discharging rate of the device (which may be impacted by the device's energy consumption and/or battery state), a discharging rate profile (e.g., a collection of discharging rates over a period of time), an current energy storage state or level, an energy storage capacity of the device, etc. In an example, the charging or discharging rate profiles can be used to estimate a future charging or discharging rate (e.g., based on an average of charging or discharging indicated by the profile, based on a current time-of-day, day-of-week, etc. and a similar time-of-day, day-of-week, etc. for the profile, etc.).

Figure 7:
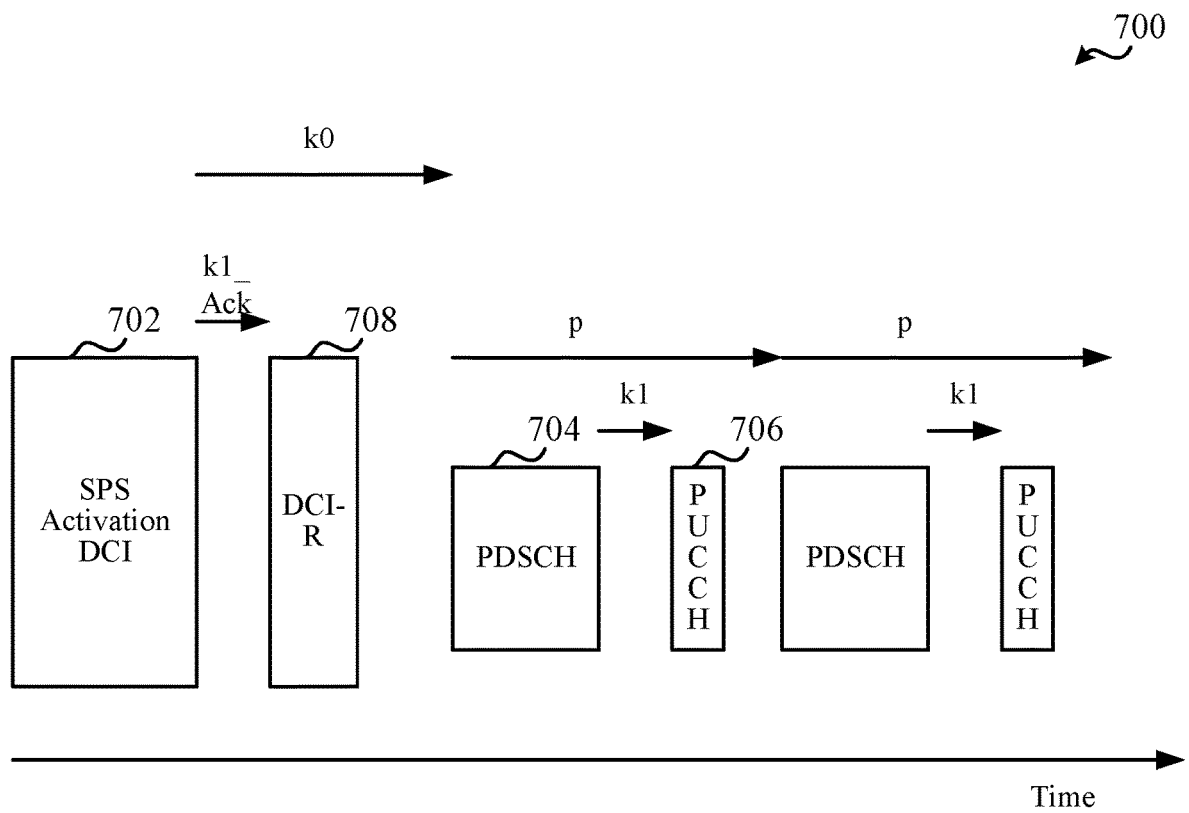
FIG. 7 illustrates a specific example of a timeline for periodic resources and transmitting a control information response, in accordance with aspects described herein.

FIG. 7 illustrates a specific example of a timeline 700 for periodic resources and transmitting a control information response. In timeline 700, for example, a base station 102 (or other device) can transmit a SPS activation DCI 702 to a UE 104 (or other device). The SPS activation DCI 702 can relate to or otherwise indicate parameters for receiving PDSCH 704 over periodic resources, such as a periodicity p, a starting offset k0 (e.g., the start of the SPS or CG), a feedback offset k1 for transmitting PUCCH 706 indicating feedback for the PDSCH 704, an RB allocation, MCS, TBS, etc. In addition, in an example, the SPS activation DCI 702 may include an offset indicating resources for transmitting a control information response (e.g., DCI response, DCI-R) 708. For example, the offset may be, or may be determined based on, k1_Ack. In this example, the CI response component 354 can transmit DCI-R to request modification of one or more parameters related to the periodic resources, such as modification for the value of p, k0, k1, MCS, RB allocation, TBS, etc. In another example, in DL, the CI response component 354 can transmit DCI-R to indicate or request modification of a set of allocations to be used for RF EH, if the UE is using RF EH—e.g., the UE desired resources/occasions for harvesting. In an example, the base station 102 can accordingly modify the value(s) as requested, and can allocate the periodic resources or corresponding parameter values based on the modification. In addition, in an example, k1_Ack can be same as k0 or k1, where k0 can be greater than k1 in this case, k1_Ack can be explicitly given in time domain resource allocation (TDRA) table, k1_Ack can be RRC configured or RRC/media access control (MAC)-control element (CE), k1_Ack can be given explicitly as k1, etc. In an example, if k1_Ack is equal to K0 (one of the mode of operations or by configuration), UE 104 can start to account for K0 from end of k1_Ack.

In another example, CI response component 354 can generate a bitmap for allocated resource occasions to indicate over which resource occasions the UE 104 is to perform wireless communications (e.g., to receive communications over PDSCH or PSSCH, to transmit communications over PUSCH or PSSCH, etc.). An example is shown in FIG. 8.

Figure 8:
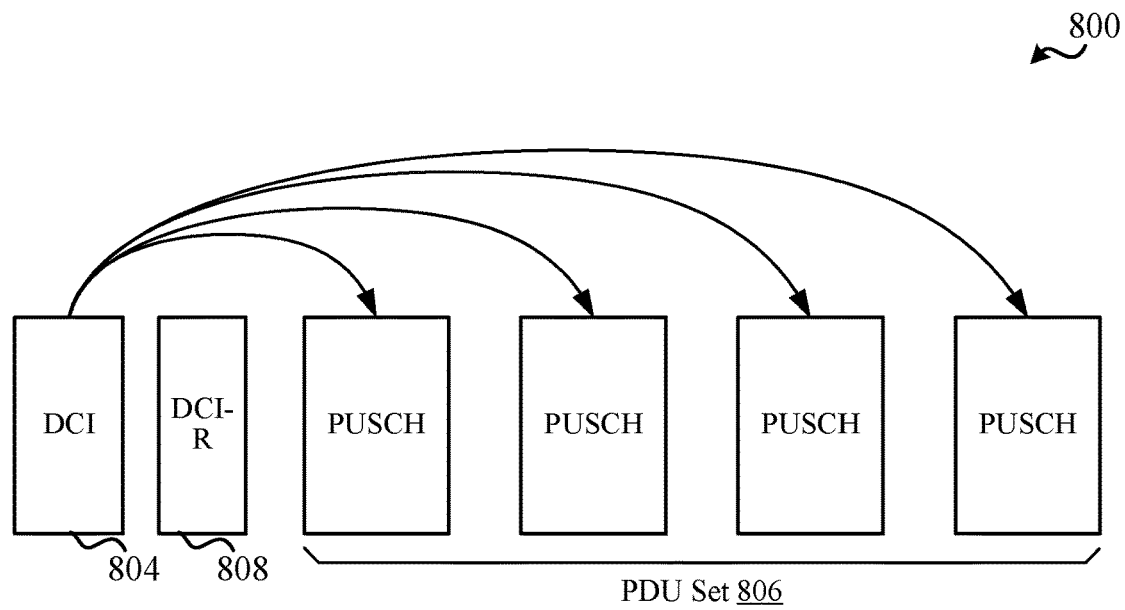
FIG. 8 illustrates examples of timelines for periodic resource allocation, in accordance with aspects described herein.
Figure 8:
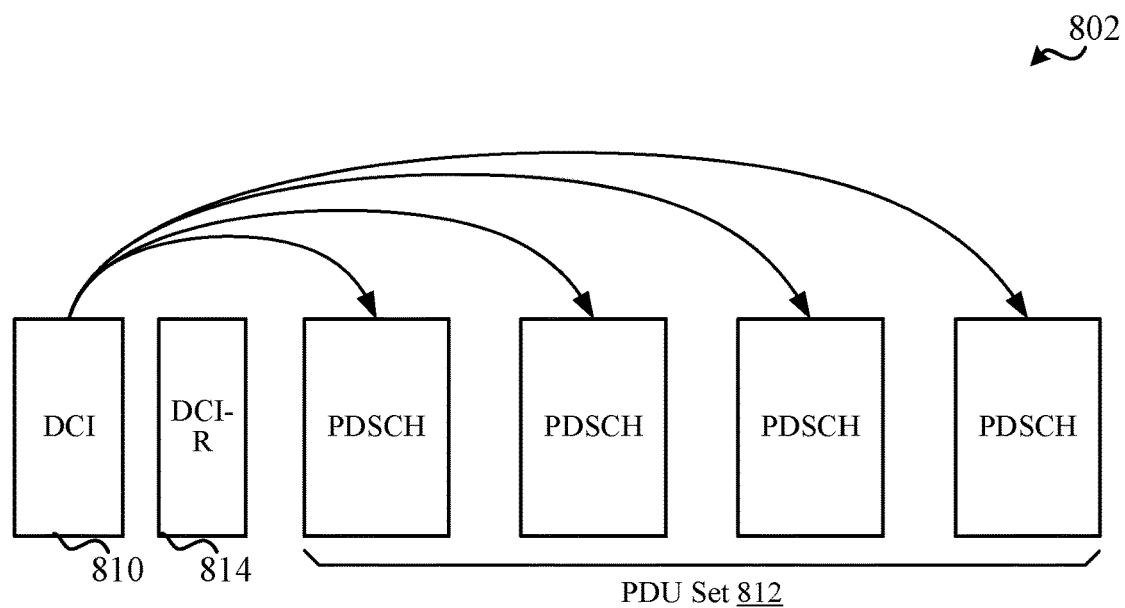

FIG. 8 illustrates examples of timelines 800, 802 for periodic resource allocation. Timeline 800 can include a DCI 804 that can be transmitted to activate a multiple PUSCH resources in a PDU set 806. In an example, the UE 104 (or other device) can generate a control information response (e.g., DCI-R 808) to indicate a portion of the multiple PUSCH resources over which the UE 104 transmits. In an example, the DCI-R 808 can include a bitmap indicating which PUSCH resources will be used. For example, in UL, selection of a subset of UL resources or occasions, from the set of resources, using a pattern or bitmap or an occasion masking can be indicated (e.g., if 8 PUSCHs by the single DCI are scheduled, the UE can send 1 1 0 0 0 0 1 1 to indicate uplink transmission over the first, second, seventh, and eighth occasions). Similarly, timeline 802 can include a DCI 810 that can be transmitted to activate a multiple PDSCH resources in a PDU set 812. In an example, the UE 104 (or other device) can generate a control information response (e.g., DCI-R 814) to indicate a portion of the multiple PDSCH resources over which the UE 104 receives.

In one example, in UL, the CI response component 354 can send the control information response as a UCI (e.g., in PUCCH) before or multiplexed with one or more (or each) PUSCH. In an example, the CI response component 354 can transmit the UCI on a certain location or RBs that the base station 102 may know the location of, or a few potential locations (e.g., for blind search) to determine whether or not the UE uses this RB allocation, and CI response processing component 454 can accordingly receive and/or process the UCI over the certain location or RBs. For example, CI response component 354 may use this process instead of sending a full bitmap/pattern indicating the RB occasions it uses to transmit PUSCH. In some cases, CI response component 354 can send indication on UCI related to more than one future PUSCH(s) to save power (e.g., use one UCI to indicate multiple PUSCH occasions, which may include indicating the bitmap of occasions), and CI response processing component 454 can receive and determine the multiple PUSCH occasions indicated in the UCI.

In another example, CI response component 354 can also use the CG-UCI (as defined in NR-unlicensed band (NR-U) and associated with each PUSCH for CGs in NR-U) to indicate the control information response (e.g., the changes desired by UE for this CG, such as periodicity, MCS, etc.). In another example, CI response component 354 can also use the CG-UCI to skip this occasion (for energy saving purposes). In an example, CI response component 354 can multiplex this DCI response with CG-UCI. For example, instead of having a UCI every PUSCH, CI response component 354 can include a UCI every k (where k is L1/L2/L3 configured and can be part of CG RRC config) to send the response or CG-UCI. In any case, as described, CI response processing component 454 can accordingly receive the CG-UCI to process or determine which PUSCHs over which to receive communications from the UE 104.

In some examples (e.g., as described above or other examples), in transmitting the control information response at Block 506, optionally at Block 512, the control information response can be multiplexed with a data signal transmitted over a subset of resource occasions. In an aspect, CI response component 354, e.g., in conjunction with processor(s) 312, memory 316, transceiver 302, UE communicating component 342, etc., can multiplex the control information response with the data signal transmitted over the subset of resource occasions. For example, referring to FIG. 8, CI response component 354 can multiplex the control information response with one or more of the PUSCH transmissions in the PDU set 806. In another example, in transmitting the control information response at Block 506, optionally at Block 514, the control information response can be multiplexed with a feedback transmission. In an aspect, CI response component 354, e.g., in conjunction with processor(s) 312, memory 316, transceiver 302, UE communicating component 342, etc., can multiplex the control information response with the feedback transmission. For example, referring to FIG. 7, CI response component 354 can multiplex the control information response with one or more of the PUCCH transmissions 706. In one example, CI response component 354 can multiplex the control information with the feedback transmission based on a timeline or one or more conditions related to transmitting the feedback.

In an example, in receiving the control information response at Block 606, optionally at Block 608, the control information response can be demultiplexed from a data signal transmitted over a subset of resource occasions. In an aspect, CI response processing component 454, e.g., in conjunction with processor(s) 412, memory 416, transceiver 402, BS communicating component 442, etc., can demultiplex the control information response from the data signal transmitted over the subset of resource occasions. For example, referring to FIG. 8, CI response processing component 454 can demultiplex the control information response from one or more of the PUSCH transmissions in the PDU set 806. In another example, in receiving the control information response at Block 606, optionally at Block 610, the control information response can be demultiplexed from a feedback transmission. In an aspect, CI response processing component 454, e.g., in conjunction with processor(s) 412, memory 416, transceiver 402, BS communicating component 442, etc., can demultiplex the control information response from the feedback transmission. For example, referring to FIG. 7, CI response processing component 454 can demultiplex the control information response from one or more of the PUCCH transmissions 706. In one example, CI response component 354 can receive and/or demultiplex the control information from the feedback transmission based on a timeline or one or more conditions related to transmitting the feedback.

For example, the control information response can be periodic as well, such that CI response component 354 can transmit the control information response periodically (e.g., for or with every n number of PUSCH transmissions). In an example, CI response component 354 can determine the periodicity for control information response based on at least one of current charging rate, current discharging rate (power consumption), current available energy (for limited storage unit, UE may not be able to store much energy), etc. In an example, CI response component 354 can request modification of the periodicity to an explicit value, a value corresponding to an index into a list of configured periodicities that can be used, a difference from a current periodicity (e.g., plus one symbol), etc. In one example, CI response component 354 can multiplex the control information response with HARQ-ACK or may drop the HARQ-ACK to transmit the control information response or may drop the control information response when there is HARQ-ACK. In another example, CI response component 354 can determine a priority for the control information response. In this example, the UE can remove conflict and decide which UL signal to transmit when there is a conflict between this DCI response and other UL signals (e.g., HARQ-ACK). Conflict can be resolved using dropping or multiplexing, as described.

In an example, if the control information response is overlapping or close in time (e.g., based on a time configuration) to one or more UL signals, the UE can multiplex the control information response with the one or more UL signals. The one or more UL signals with which the control information response can be multiplexed can include one or more of a BSR, SR, CSI, HARQ-ACK, power headroom report (PHR), MAC-CE, random access channel (RACH) message, RRC signal, user assistance information (UAI), etc. For example, if an amount of time between the control information response (e.g., the resources configured for the control information response) and the one or more UL signals is less than a threshold (which may be defined in RRC, MAC-CE, DCI, etc.), CI response component 354 can wait and multiplex the control information response with the one or more UL signals. In an example, the DCI that scheduled the allocation or a new non-scheduling DCI can indicate the threshold. In another example, CI response component 354 can be allowed to use any occasion, e.g., indicated control information response resources or a multiplexed occasion.

In method 500, optionally at Block 516, the one or more instances of the periodic resources can be communicated in based on the modifications to the one or more parameters. In an aspect, UE communicating component 342, e.g., in conjunction with processor(s) 312, memory 316, transceiver 302, etc., can communicate in the one or more instances of the periodic resource based on the modification to the one or more parameters. For example, UE communicating component 342 can transmit PUSCH or PSSCH over the periodic resources or can receive PDSCH or PSSCH over the periodic resources based on the modification to the one or more parameters.

Similarly, in method 600, optionally at Block 612, the one or more instances of the periodic resources can be communicated in based on the modifications to the one or more parameters. In an aspect, BS communicating component 442, e.g., in conjunction with processor(s) 412, memory 416, transceiver 402, etc., can communicate in the one or more instances of the periodic resource based on the modification to the one or more parameters. For example, BS communicating component 442 can receive PUSCH or PSSCH over the periodic resources or can transmit PDSCH or PSSCH over the periodic resources based on the modification to the one or more parameters.

In method 600, optionally at Block 614, a reactivation DCI can be transmitted confirming the modification to the one or more parameters. In an aspect, BS communicating component 442, e.g., in conjunction with processor(s) 412, memory 416, transceiver 402, etc., can transmit the reactivation DCI (or other reactivation control information) confirming the modification to the one or more parameters. In an example, BS communicating component 442 can communicate based on the modification to the one or more parameters in response to or otherwise based on transmitting the reactivation DCI.

In an example, the reactivation DCI may be an existing DCI format or a new DCI format, and may have a size of one bit (or few bits) confirming the modification to the one or more parameters. In another example, the DCI may have a size greater than one (e.g., equal to the number of parameters for which the UE can request modification). For example, UE 104 may be configured to request modification of a number, X, of parameters; in this example, the network node can use log 2(X)=B bits for reporting which parameters of the X combinations are modified as requested. If UE is requesting modification of each parameter individually (e.g., which may not include a set of parameters as preference), the UE 104 can be indicated, for example, to suggest Y1 values for parameter P1, Y2 values for parameter P2, etc. In this example, the network node can make control information (e.g., DCI) with certain size indicating the final parameters, and the size of the DCI may depend on configuration between the network node and UE 104 (or can be defined in a wireless communication technology specification, such as 5G NR), etc. In other examples, the network node can use the reactivation DCI, as described.

In method 500, optionally at Block 518, a reactivation DCI can be received confirming the modification to the one or more parameters. In an aspect, UE communicating component 342, e.g., in conjunction with processor(s) 312, memory 316, transceiver 302, etc., can receive the reactivation DCI (or other reactivation control information) confirming the modification to the one or more parameters (e.g., from the base station 102 or other device scheduling the UE 104). In an example, UE communicating component 342 can communicate based on the modification to the one or more parameters in response to or otherwise based on receiving the reactivation DCI.

In some examples, the network node may support modification of certain parameters for certain time resources (e.g., which may be dynamically indicated) or over certain frequency resources (e.g., bandwidth parts (BWPs)). In one example, in method 600, optionally at Block 606, capability information regarding parameters that can be modified can be transmitted. In an aspect, CI component 452, e.g., in conjunction with processor(s) 412, memory 416, transceiver 402, BS communicating component 442, etc., can transmit the capability information regarding parameters that can be modified (e.g., the parameters of the CI for which the network node supports modification). For example, the capability information may indicate a subset of the parameters for which modification is supported (e.g., modification supported for MCS but not for other parameters). In an example, CI component 452 can transmit the capability information in L1, L2, or L3 signaling, and the capability information can apply until other capability information is transmitted, can apply to one or more indicated time periods, etc. In addition, for example, the capability information can apply to all configured frequency resources, to certain BWPs (or a BWP configuration that may correspond to one or more BWPs) or set of BWPs (or set of BWP configurations that may each correspond to one or more BWPs), etc.

In one example, in method 500, optionally at Block 520, capability information regarding parameters that can be modified can be received. In an aspect, CI processing component 352, e.g., in conjunction with processor(s) 312, memory 316, transceiver 302, UE communicating component 342, etc., can receive the capability information regarding parameters that can be modified (e.g., the parameters of the CI for which the network node supports modification). As described, the capability information can indicate the supported parameters for a period of time, for a portion of frequency (e.g., a BWP configuration or set of BWP configurations), etc. In this example, at Block 506, CI response component 354 can transmit and/or generate the control information response to modify only the parameters for which modification is supported in a time period or over a corresponding BWP or other frequency resource. Similarly, for example, at Block 606, CI response processing component 454 may expect to receive a control information response that request modification only of parameters for which modification capability is indicated in the capability information transmitted at Block 616.

Figure 9:
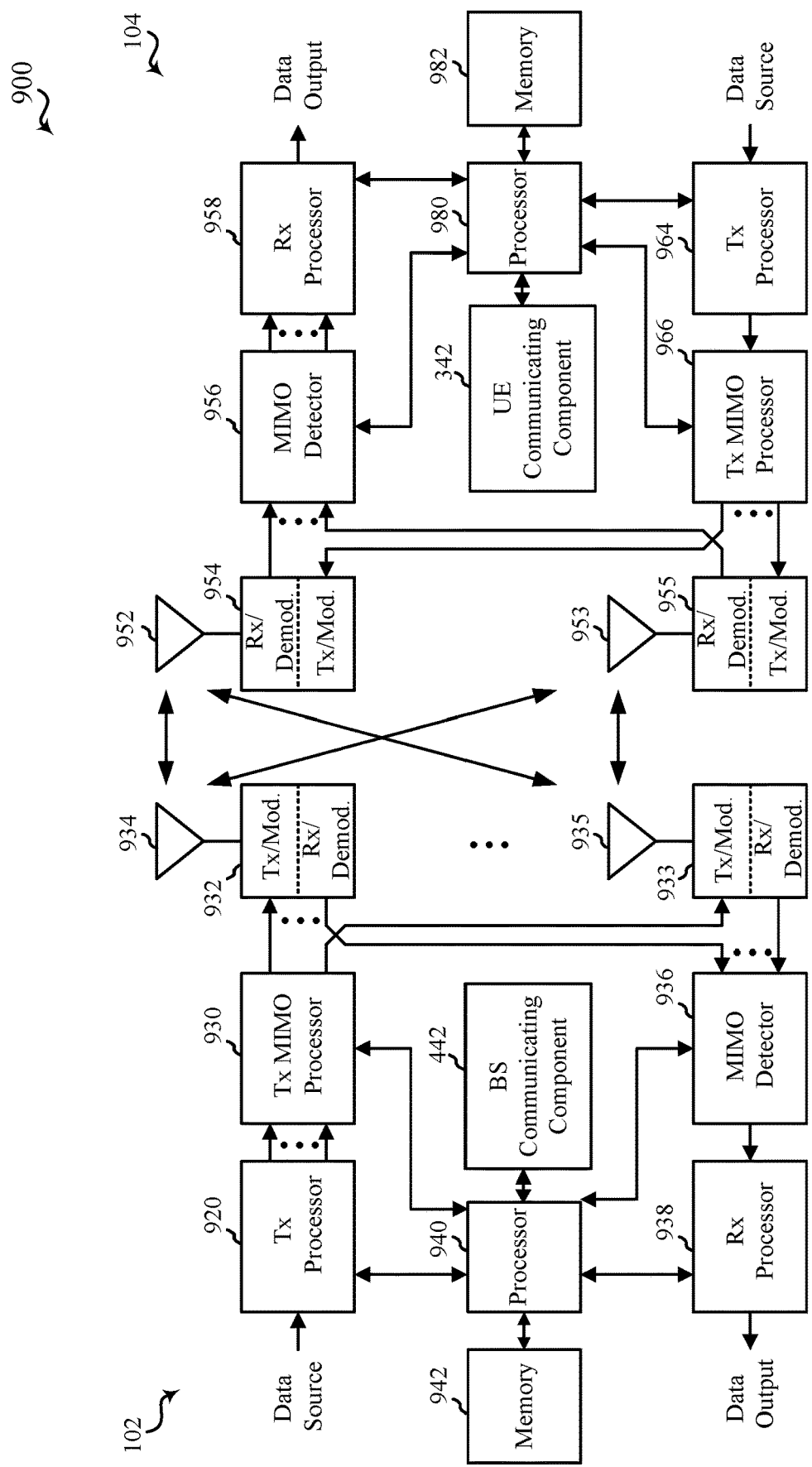
FIG. 9 is a block diagram illustrating an example of a multiple-input multiple-output (MIMO) communication system including a base station and a UE, in accordance with various aspects of the present disclosure.

FIG. 9 is a block diagram of a MIMO communication system 900 including a base station 102 and a UE 104. The MIMO communication system 900 may illustrate aspects of the wireless communication access network 100 described with reference to FIG. 1. The base station 102 may be an example of aspects of the base station 102 described with reference to FIG. 1. The base station 102 may be equipped with antennas 934 and 935, and the UE 104 may be equipped with antennas 952 and 953. In the MIMO communication system 900, the base station 102 may be able to send data over multiple communication links at the same time. Each communication link may be called a "layer" and the "rank" of the communication link may indicate the number of layers used for communication. For example, in a 2×2 MIMO communication system where base station 102 transmits two "layers," the rank of the communication link between the base station 102 and the UE 104 is two.

At the base station 102, a transmit (Tx) processor 920 may receive data from a data source. The transmit processor 920 may process the data. The transmit processor 920 may also generate control symbols or reference symbols. A transmit MIMO processor 930 may perform spatial processing (e.g., precoding) on data symbols, control symbols, or reference symbols, if applicable, and may provide output symbol streams to the transmit modulator/demodulators 932 and 933. Each modulator/demodulator 932 through 933 may process a respective output symbol stream (e.g., for OFDM, etc.) to obtain an output sample stream. Each modulator/demodulator 932 through 933 may further process (e.g., convert to analog, amplify, filter, and upconvert) the output sample stream to obtain a DL signal. In one example, DL signals from modulator/demodulators 932 and 933 may be transmitted via the antennas 934 and 935, respectively.

The UE 104 may be an example of aspects of the UEs 104 described with reference to FIGS. 1 and 3. At the UE 104, the UE antennas 952 and 953 may receive the DL signals from the base station 102 and may provide the received signals to the modulator/demodulators 954 and 955, respectively. Each modulator/demodulator 954 through 955 may condition (e.g., filter, amplify, downconvert, and digitize) a respective received signal to obtain input samples. Each modulator/demodulator 954 through 955 may further process the input samples (e.g., for OFDM, etc.) to obtain received symbols. A MIMO detector 956 may obtain received symbols from the modulator/demodulators 954 and 955, perform MIMO detection on the received symbols, if applicable, and provide detected symbols. A receive (Rx) processor 958 may process (e.g., demodulate, deinterleave, and decode) the detected symbols, providing decoded data for the UE 104 to a data output, and provide decoded control information to a processor 980, or memory 982.

The processor 980 may in some cases execute stored instructions to instantiate a UE communicating component 342 (see e.g., FIGS. 1 and 3).

On the uplink (UL), at the UE 104, a transmit processor 964 may receive and process data from a data source. The transmit processor 964 may also generate reference symbols for a reference signal. The symbols from the transmit processor 964 may be precoded by a transmit MIMO processor 966 if applicable, further processed by the modulator/demodulators 954 and 955 (e.g., for single carrier-FDMA, etc.), and be transmitted to the base station 102 in accordance with the communication parameters received from the base station 102. At the base station 102, the UL signals from the UE 104 may be received by the antennas 934 and 935, processed by the modulator/demodulators 932 and 933, detected by a MIMO detector 936 if applicable, and further processed by a receive processor 938. The receive processor 938 may provide decoded data to a data output and to the processor 940 or memory 942.

The processor 940 may in some cases execute stored instructions to instantiate a BS communicating component 442 (see e.g., FIGS. 1 and 4).

The components of the UE 104 may individually or collectively, be implemented with one or more ASICs adapted to perform some or all of the applicable functions in hardware. Each of the noted modules may be a means for performing one or more functions related to operation of the MIMO communication system 900. Similarly, the components of the base station 102 may individually or collectively, be implemented with one or more application specific integrated circuits (ASICs) adapted to perform some or all of the applicable functions in hardware. Each of the noted components may be a means for performing one or more functions related to operation of the MIMO communication system 900.

The following aspects are illustrative only and aspects thereof may be combined with aspects of other embodiments or teaching described herein, without limitation.

Aspect 1 is a method for wireless communication at a first node including receiving, from a second node, control information activating periodic resources defined in a configuration for wireless communication, wherein the control information indicates resources for transmitting a control information response, and transmitting, to the second node and based on one or more power-related parameters of the first node, the control information response indicating a modification for one or more parameters related to the periodic resources.

In Aspect 2, the method of Aspect 1 includes receiving, from the second node in semi-static signaling, the configuration defining the periodic resources that can be activated by the second node for wireless communication.

In Aspect 3, the method of any of Aspects 1 or 2 includes wherein transmitting the control information response is based on comparing the one or more power-related parameters to one or more thresholds.

In Aspect 4, the method of Aspect 3 includes wherein the one or more power-related parameters are based on a power consumption model of the first node.

In Aspect 5, the method of any of Aspects 3 or 4 includes wherein the one or more power-related parameters include one or more of a current charging rate, a charging rate profile, a discharging rate, a discharging rate profile, an energy storage state or level, or an energy storage capacity.

In Aspect 6, the method of any of Aspects 1 to 5 includes wherein the one or more parameters include a periodicity of the periodic resources indicated in the configuration.

In Aspect 7, the method of Aspect 6 includes wherein the control information response indicates the periodicity as an index corresponding to periodicities configured in RRC signaling or in an updated MAC-CE, or as a difference from a configured periodicity indicated in the configuration.

In Aspect 8, the method of any of Aspects 1 to 7 includes wherein the one or more parameters indicate a selection of a subset of resource occasions activated by the control information.

In Aspect 9, the method of Aspect 8 includes wherein the one or more parameters include a bitmap indicating the selection of the subset of resource occasions.

In Aspect 10, the method of any of Aspects 8 or 9 includes wherein transmitting the control information response includes transmitting the control information response before, or multiplexing the control information response with, a data signal transmitted over each of the subset of resource occasions.

In Aspect 11, the method of any of Aspects 1 to 10 includes wherein transmitting the control information response includes transmitting CG-UCI multiplexed with, or otherwise indicating, the control information response.

In Aspect 12, the method of any of Aspects 1 to 11 includes wherein transmitting the control information response is based on one or more of a starting offset, feedback offset, an indication in a TDRA table, or an indication in RRC or MAC-CE.

In Aspect 13, the method of any of Aspects 1 to 12 includes wherein the one or more parameters include one or more of a feedback offset, a MCS, number of antenna layers, number of RB, or TBS, a periodicity of the periodic resources, a configured grant index, or a semi-persistent scheduling index, indicated in the configuration.

In Aspect 14, the method of any of Aspects 1 to 13 includes wherein the one or more parameters include a gap between at least a first and at least a second scheduled data resource scheduled by same control information or a number of scheduled resources scheduled by the same control information.

In Aspect 15, the method of any of Aspects 1 to 14 includes receiving, from the second node, capability information indicating a subset of a plurality of parameters can be modified over time or frequency resources, wherein the control information indicates modification of one or more parameters that are in the subset of the plurality of parameters.

In Aspect 16, the method of any of Aspects 1 to 15 includes wherein transmitting the control information response is based on an indication that the periodic resources are used for RF EH at the first node.

In Aspect 17, the method of any of Aspects 1 to 16 includes wherein the one or more parameters include a feedback offset for the periodic resources indicated in the configuration.

In Aspect 18, the method of any of Aspects 1 to 17 includes receiving, from the second node, a reactivation DCI or a new DCI confirming the modification to the one or more parameters.

In Aspect 19, the method of any of Aspects 1 to 18 includes wherein transmitting the control information response includes one of multiplexing the control information response with feedback, or dropping the feedback to transmit the control information response in resources defined for transmitting the feedback.

In Aspect 20, the method of any of Aspects 1 to 19 includes communicating with the second node in one or more instances of the periodic resources based on the modification to the one or more parameters.

Aspect 21 is a method for wireless communication at a first node including transmitting, to a second node, control information activating periodic resources defined in a configuration for wireless communication, wherein the control information indicates resources for transmitting a control information response, and receiving, from the second node and based on one or more power-related parameters of the second node, the control information response indicating a modification for one or more parameters related to the periodic resources.

In Aspect 22, the method of Aspect 21 includes transmitting, to the second node in semi-static signaling, the configuration defining the periodic resources that can be activated by the first node for wireless communication.

In Aspect 23, the method of any of Aspects 21 or 22 includes wherein the one or more parameters include a periodicity of the periodic resources indicated in the configuration.

In Aspect 24, the method of Aspect 23 includes wherein the control information response indicates the periodicity as an index corresponding to periodicities configured in RRC signaling or in an updated MAC-CE, or as a difference from a configured periodicity indicated in the configuration.

In Aspect 25, the method of any of Aspects 21 to 24 includes wherein the one or more parameters indicate a selection of a subset of resource occasions activated by the control information.

In Aspect 26, the method of Aspect 25 includes wherein the one or more parameters include a bitmap indicating the selection of the subset of resource occasions.

In Aspect 27, the method of any of Aspects 25 or 26 includes wherein receiving the control information response includes receiving the control information response before, or as multiplexed with, a data signal over each of the subset of resource occasions.

In Aspect 28, the method of any of Aspects 21 to 27 includes wherein receiving the control information response includes receiving CG-UCI multiplexed with, or otherwise indicating, the control information response.

In Aspect 29, the method of any of Aspects 21 to 28 includes wherein receiving the control information response is based on one or more of a starting offset, a feedback offset, an indication in a TDRA table, or an indication in RRC or MAC-CE.

In Aspect 30, the method of any of Aspects 21 to 29 includes wherein the one or more parameters include one or more of a feedback offset, a MCS, number of antenna layers, number of RBs, or TBS, indicated in the configuration.

In Aspect 31, the method of any of Aspects 21 to 30 includes wherein the one or more parameters include a gap between the periodic resources scheduled by same control information or a number of the periodic resources scheduled by same control information.

In Aspect 32, the method of any of Aspects 21 to 31 includes transmitting, to the second node, capability information indicating a subset of a plurality of parameters can be modified over time or frequency resources, wherein the control information indicates modification of one or more parameters that are in the subset of the plurality of parameters.

In Aspect 33, the method of any of Aspects 21 to 32 includes wherein receiving the control information response is based on an indication that the periodic resources are used for RF EH at the first node.

In Aspect 34, the method of any of Aspects 21 to 33 includes wherein the one or more parameters include a feedback offset for the periodic resources indicated in the configuration.

In Aspect 35, the method of any of Aspects 21 to 34 includes transmitting, to the second node, a reactivation DCI or a new DCI confirming the modification to the one or more parameters.

In Aspect 36, the method of any of Aspects 21 to 35 includes wherein receiving the control information response includes receiving the control information response multiplexed with feedback, or otherwise in resources defined for receiving the feedback based on a timeline or one or more conditions.

In Aspect 37, the method of any of Aspects 21 to 36 includes communicating with the second node in one or more instances of the periodic resources based on the modification to the one or more parameters.

Aspect 38 is an apparatus for wireless communication including a processor, memory coupled with the processor, and instructions stored in the memory and operable, when executed by the processor, to cause the apparatus to perform any of the methods of Aspects 1 to 37.

Aspect 39 is an apparatus for wireless communication including means for performing any of the methods of Aspects 1 to 37.

Aspect 40 is a computer-readable medium including code executable by one or more processors for wireless communications, the code including code for performing any of the methods of Aspects 1 to 37.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially programmed device, such as but not limited to a processor, a digital signal processor (DSP), an ASIC, a field programmable gate array (FPGA) or other programmable logic device, a discrete gate or transistor logic, a discrete hardware component, or any combination thereof designed to perform the functions described herein. A specially programmed processor may be a microprocessor, but in the alternative, the processor may be any conventional processor, controller, microcontroller, or state machine. A specially programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:

1. An apparatus for wireless communication, comprising:
a processor;
memory coupled with the processor; and
instructions stored in the memory and operable, when executed by the processor, to cause the apparatus to:
receive, from a second node, control information activating periodic resources defined in a configuration for wireless communication, wherein the control information indicates resources for transmitting a control information response; and
transmit, to the second node and based on one or more power-related parameters of the apparatus, the control information response indicating a modification for one or more parameters related to the periodic resources.

2. The apparatus of claim 1, wherein the instructions, when executed by the processor, further cause the apparatus to receive, from the second node in semi-static signaling, the configuration defining the periodic resources that can be activated by the second node for wireless communication.

3. The apparatus of claim 1, wherein the instructions, when executed by the processor, cause the apparatus to transmit the control information response based on comparing the one or more power-related parameters to one or more thresholds.

4. The apparatus of claim 3, wherein the one or more power-related parameters are based on a power consumption model of the apparatus.

5. The apparatus of claim 3, wherein the one or more power-related parameters include one or more of a current charging rate, a charging rate profile, a discharging rate, a discharging rate profile, an energy storage state or level, or an energy storage capacity.

6. The apparatus of claim 1, wherein the one or more parameters include a periodicity of the periodic resources indicated in the configuration.

7. The apparatus of claim 6, wherein the control information response indicates the periodicity as an index corresponding to periodicities configured in radio resource control (RRC) signaling or in an updated media access control (MAC)-control element (CE), or as a difference from a configured periodicity indicated in the configuration.

8. The apparatus of claim 1, wherein the one or more parameters indicate a selection of a subset of resource occasions activated by the control information.

9. The apparatus of claim 8, wherein the one or more parameters include a bitmap indicating the selection of the subset of resource occasions.

10. The apparatus of claim 8, wherein the instructions, when executed by the processor, cause the apparatus to transmit the control information response before, or multiplex the control information response with, a data signal transmitted over each of the subset of resource occasions.

11. The apparatus of claim 1, wherein the instructions, when executed by the processor, cause the apparatus to transmit configured grant (CG)-uplink control information (UCI) multiplexed with, or otherwise indicating, the control information response.

12. The apparatus of claim 1, wherein the instructions, when executed by the processor, cause the apparatus to transmit the control information response based on one or more of a starting offset, feedback offset, an indication in a time domain resource allocation (TDRA) table, or an indication in radio resource control (RRC) or media access control (MAC)-control element (CE).

13. The apparatus of claim 1, wherein the one or more parameters include one or more of a feedback offset, a modulation and coding scheme (MCS), number of antenna layers, number of resource blocks (RBs), or transport block size (TBS), a periodicity of the periodic resources, a configured grant index, or a semi-persistent scheduling index, indicated in the configuration.

14. The apparatus of claim 1, wherein the one or more parameters include a gap between at least a first and at least a second scheduled data resource scheduled by the control information or a number of scheduled resources scheduled by the control information.

15. The apparatus of claim 1, wherein the instructions, when executed by the processor, further cause the apparatus to receive, from the second node, capability information indicating a subset of a plurality of parameters can be modified over time or frequency resources, wherein the control information indicates modification of one or more parameters that are in the subset of the plurality of parameters.

16. The apparatus of claim 1, wherein the instructions, when executed by the processor, cause the apparatus to transmit the control information response based on an indication that the periodic resources are used for radio frequency (RF) energy harvesting (EH) at the apparatus.

17. The apparatus of claim 1, wherein the one or more parameters include a feedback offset for the periodic resources indicated in the configuration.

18. The apparatus of claim 1, wherein the instructions, when executed by the processor, further cause the apparatus to receive, from the second node, a reactivation downlink control information (DCI) or a new DCI confirming the modification to the one or more parameters.

19. The apparatus of claim 1, wherein the instructions, when executed by the processor, cause the apparatus to transmit the control information response at least in part by one of multiplexing the control information response with feedback, or dropping the feedback to transmit the control information response in resources defined for transmitting the feedback.

20. The apparatus of claim 1, wherein the instructions, when executed by the processor, further cause the apparatus to communicate with the second node in one or more instances of the periodic resources based on the modification to the one or more parameters.

21. An apparatus for wireless communication, comprising:
a processor;
memory coupled with the processor; and
instructions stored in the memory and operable, when executed by the processor, to cause the apparatus to:
transmit, to a second node, control information activating periodic resources defined in a configuration for wireless communication, wherein the control information indicates resources for transmitting a control information response; and
receive, from the second node and based on one or more power-related parameters of the second node, the control information response indicating a modification for one or more parameters related to the periodic resources.

22. The apparatus of claim 21, wherein the instructions, when executed by the processor, further cause the apparatus to transmit, to the second node in semi-static signaling, the configuration defining the periodic resources that can be activated by the apparatus for wireless communication.

23. The apparatus of claim 21, wherein the one or more parameters include a periodicity of the periodic resources indicated in the configuration.

24. The apparatus of claim 23, wherein the control information response indicates the periodicity as an index corresponding to periodicities configured in radio resource control (RRC) signaling or in an updated media access control (MAC)-control element (CE), or as a difference from a configured periodicity indicated in the configuration.

25. The apparatus of claim 21, wherein the one or more parameters indicate a selection of a subset of resource occasions activated by the control information.

26. The apparatus of claim 21, wherein the instructions, when executed by the processor, cause the apparatus to receive configured grant (CG)-uplink control information (UCI) multiplexed with, or otherwise indicating, the control information response.

27. A method for wireless communication at a first node, comprising:
   receiving, from a second node, control information activating periodic resources defined in a configuration for wireless communication, wherein the control information indicates resources for transmitting a control information response; and
   transmitting, to the second node and based on one or more power-related parameters of the first node, the control information response indicating a modification for one or more parameters related to the periodic resources.

28. The method of claim 27, further comprising receiving, from the second node in semi-static signaling, the configuration defining the periodic resources that can be activated by the second node for wireless communication.

29. A method for wireless communication at a first node, comprising:
   transmitting, to a second node, control information activating periodic resources defined in a configuration for wireless communication, wherein the control information indicates resources for transmitting a control information response; and
   receiving, from the second node and based on one or more power-related parameters of the second node, the control information response indicating a modification for one or more parameters related to the periodic resources.

30. The method of claim 29, further comprising transmitting, to the second node in semi-static signaling, the configuration defining the periodic resources that can be activated by the first node for wireless communication.

* * * * *